US010274782B2

(12) United States Patent
Yonemoto et al.

(10) Patent No.: US 10,274,782 B2
(45) Date of Patent: Apr. 30, 2019

(54) BACKLIGHT UNIT, LIQUID CRYSTAL DISPLAY DEVICE, AND WAVELENGTH CONVERSION MEMBER

(71) Applicant: FUJIFILM Corporation, Tokyo (JP)

(72) Inventors: Takashi Yonemoto, Kanagawa (JP); Eijiro Iwase, Kanagawa (JP); Koichi Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 14 days.

(21) Appl. No.: 15/471,577

(22) Filed: Mar. 28, 2017

(65) Prior Publication Data

US 2017/0199315 A1 Jul. 13, 2017

Related U.S. Application Data

(63) Continuation of application No. PCT/JP2015/077755, filed on Sep. 30, 2015.

(30) Foreign Application Priority Data

Sep. 30, 2014 (JP) .................................. 2014-202426
Sep. 29, 2015 (JP) .................................. 2015-192309

(51) Int. Cl.
*G02F 1/13357* (2006.01)
*G02F 1/1335* (2006.01)
(Continued)

(52) U.S. Cl.
CPC .............. *G02F 1/1336* (2013.01); *B32B 7/04* (2013.01); *B32B 27/08* (2013.01); *B32B 27/18* (2013.01);
(Continued)

(58) Field of Classification Search
CPC .... G02B 6/005; G02B 6/0065; G02B 6/0011; G02B 6/0013; G02B 6/0015;
(Continued)

(56) References Cited

U.S. PATENT DOCUMENTS

2006/0262555 A1* 11/2006 Yi ..................... G02F 1/133604
362/561
2007/0290146 A1* 12/2007 Fukui ....................... G21K 4/00
250/484.4
(Continued)

FOREIGN PATENT DOCUMENTS

JP 2013-544018 A 12/2013
WO 2012/064562 A1 5/2012

OTHER PUBLICATIONS

International Search Report issued in connection with International Patent Application No. PCT/JP2015/077755 dated Dec. 15, 2015.
(Continued)

*Primary Examiner* — Shan Liu
(74) *Attorney, Agent, or Firm* — Edwards Neils, LLC; Jean C. Edwards, Esq.

(57) ABSTRACT

Provided is a backlight unit, including: a light source allowing light having a light emission center wavelength of λ nm to exit; and a wavelength conversion member positioned on an optical path of the light exiting from the light source, in which the wavelength conversion member includes a wavelength conversion layer containing a fluorescent material which is excited by exciting light and emits fluorescent light, and a light scattering layer containing particles having a particle size of greater than or equal to 0.1 μm in a matrix, an average refractive index n1 of the wavelength conversion layer satisfies a relationship of n1<n2 with respect to an average refractive index n2 of the matrix of the light scattering layer, and a light absorptivity of the light scattering layer at a wavelength of λ nm is less than or equal to 8.0%.

19 Claims, 5 Drawing Sheets

(51) Int. Cl.
*B32B 7/04* (2006.01)
*B32B 27/36* (2006.01)
*F21V 8/00* (2006.01)
*B32B 27/08* (2006.01)
*B32B 27/18* (2006.01)

(52) U.S. Cl.
CPC .............. *B32B 27/36* (2013.01); *G02B 6/005* (2013.01); *G02B 6/0065* (2013.01); *G02F 1/133606* (2013.01); *B32B 2250/02* (2013.01); *B32B 2250/244* (2013.01); *B32B 2255/10* (2013.01); *B32B 2255/20* (2013.01); *B32B 2255/205* (2013.01); *B32B 2255/24* (2013.01); *B32B 2255/26* (2013.01); *B32B 2255/28* (2013.01); *B32B 2264/025* (2013.01); *B32B 2264/0235* (2013.01); *B32B 2264/0257* (2013.01); *B32B 2264/0264* (2013.01); *B32B 2264/0292* (2013.01); *B32B 2307/40* (2013.01); *B32B 2307/412* (2013.01); *B32B 2307/418* (2013.01); *B32B 2307/422* (2013.01); *B32B 2307/536* (2013.01); *B32B 2307/558* (2013.01); *B32B 2307/708* (2013.01); *B32B 2307/724* (2013.01); *B32B 2307/7242* (2013.01); *B32B 2307/7244* (2013.01); *B32B 2307/7246* (2013.01); *B32B 2307/732* (2013.01); *B32B 2457/202* (2013.01); *G02F 2001/133614* (2013.01)

(58) Field of Classification Search
CPC .... G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 6/0088; B32B 27/18; B32B 27/08; B32B 2457/202; B32B 2307/422; B32B 7/04; B32B 27/36; B32B 2307/412; B32B 2250/244; B32B 2255/20; B32B 2255/205; B32B 2307/73; B32B 2307/536; B32B 2307/418; B32B 2250/02; B32B 2307/40; B32B 2264/0292; B32B 2264/0264; B32B 2264/0257; B32B 2264/025; B32B 2264/0235; B32B 2255/28; B32B 2255/26; B32B 2255/24; G02F 1/133603; G02F 1/133617; G02F 2001/133614; G02F 1/1336; G02F 2001/133607; G02F 2001/133616; G02F 1/133606; G02F 1/133504; G02F 1/133615; G02F 2202/28
USPC .......................... 349/69–71, 61–64, 65, 122
See application file for complete search history.

(56) References Cited

U.S. PATENT DOCUMENTS

| | | | |
|---|---|---|---|
| 2010/0046207 A1* | 2/2010 | Han .................... | G02B 6/0025 362/97.2 |
| 2011/0020607 A1* | 1/2011 | Sohn .................. | C09K 11/7731 428/168 |
| 2014/0319995 A1* | 10/2014 | Kim .................. | G02F 1/133512 313/501 |
| 2015/0036379 A1* | 2/2015 | Lee .................... | G02F 1/133617 362/606 |
| 2015/0177427 A1* | 6/2015 | Morinaka ........... | H01L 51/5268 362/355 |
| 2015/0300600 A1* | 10/2015 | Dubrow ................ | B82Y 20/00 362/330 |
| 2016/0004124 A1* | 1/2016 | Benoit ............. | G02F 1/133603 349/69 |
| 2017/0229594 A1* | 8/2017 | Fujino ................ | H01L 31/0512 |

OTHER PUBLICATIONS

Written Opinion issued in connection with International Patent Application No. PCT/JP2015/077755 dated Dec. 15, 2015.
International Preliminary Report on Patentability and Written Opinion issued by WIPO dated Apr. 13, 2017, in connection with International Patent Application No. PCT/JP2015/077755.
Notification of Reasons for Refusal issued by the Japanese Patent Office dated Jul. 4, 2017 in connection with Japanese Patent Application No. 2015-192309.

* cited by examiner

BACKLIGHT UNIT, LIQUID CRYSTAL DISPLAY DEVICE, AND WAVELENGTH CONVERSION MEMBER

CROSS-REFERENCE TO RELATED APPLICATIONS

This application is a Continuation of PCT International Application No. PCT/JP2015/077755 filed on Sep. 30, 2015, which was published under PCT Article 21(2) in Japanese and claims priority under 35 U.S.C § 119(a) to Japanese Patent Application No. 2014-202426 filed on Sep. 30, 2014 and Japanese Patent Application No. 2015-192309 filed on Sep. 29, 2015. The above applications are hereby expressly incorporated by reference, in their entirety, into the present application.

BACKGROUND OF THE INVENTION

1. Field of the Invention

The present invention relates to a backlight unit, a liquid crystal display device, and a wavelength conversion member.

2. Description of the Related Art

A flat panel display such as a liquid crystal display device (hereinafter, also referred to as a liquid crystal display (LCD)) has been widely used year by year as a space saving image display device having low power consumption. The liquid crystal display device is configured of at least a backlight unit and a liquid crystal cell.

A backlight unit including a white light source such as a white light-emitting diode (LED) as a light source has been widely used as the backlight unit. Regarding this, recently, for example, a novel backlight unit which realizes white light by light emitted from a light source such as a blue LED and light emitted from a wavelength conversion member containing a fluorescent material which is excited by light exiting from a light source and emits fluorescent light, the wavelength conversion member disposed as a member separated from the light source, has been proposed instead of the white light source (refer to JP2013-544018A).

SUMMARY OF THE INVENTION

However, in JP2013-544018A, it is described that particles (described as scattering particles in JP2013-544018A) are arranged in a portion separated from a layer containing a fluorescent material (the wavelength conversion layer) in order to allow the portion to have a function of scattering light (for example, refer to paragraphs 0162 and 0163 of JP2013-544018A). The present inventors have conducted studies by predicting that allowing the portion separated from the wavelength conversion layer to have a function of scattering light increases the amount of exciting light which is incident on the wavelength conversion layer or the amount of light which exits from the wavelength conversion layer and is incident on a liquid crystal cell, and thus, can improve a brightness of a liquid crystal display device. As a result of the studies, it is confirmed that the brightness can be improved by disposing the portion described above, compared to a case of not including the portion, and in a case where further brightness improvement can be attained, it is possible to expect that a vivid image having a higher brightness is displayed by a liquid crystal display device, a low cost due to a decrease in a use amount of the fluorescent material for attaining a certain brightness is attained, or the backlight unit is thinned due to a reduction in the thickness of the wavelength conversion layer.

Therefore, an object of the present invention is to attain further brightness improvement in a liquid crystal display device provided with a backlight unit including a wavelength conversion member.

An aspect of the present invention relates to a backlight unit, comprising: a light source allowing light having a light emission center wavelength of $\lambda$ nm to exit; and a wavelength conversion member positioned on an optical path of the light exiting from the light source, in which the wavelength conversion member includes a wavelength conversion layer containing a fluorescent material which is excited by exciting light and emits fluorescent light, and a light scattering layer containing particles having a particle size of greater than or equal to 0.1 μm in a matrix, an average refractive index n1 of the wavelength conversion layer satisfies a relationship of n1<n2 with respect to an average refractive index n2 of the matrix of the light scattering layer, and a light absorptivity of the light scattering layer at a wavelength of $\lambda$ nm is less than or equal to 8.0%.

A cross-sectional surface of the light scattering layer is observed with a scanning electron microscope (SEM), and an arithmetic average particle size of 20 particles which are randomly extracted is set to the particle size of the particles. Specifically, the cross-sectional surface of the light scattering layer is imaged at a magnification of 5000 times, and primary particle diameters of 20 particles which are randomly extracted from the obtained image are measured. In particles which are not in the shape of a sphere, an average value of the length of a long axis and the length of a short axis is obtained, and the average value is adopted as the primary particle diameter. Thus, an arithmetic average of the primary particle diameters obtained with respect to 20 particles which are randomly extracted is set to the particle size of the particles. Furthermore, a particle size in examples described below is a value measured by using S-3400N manufactured by Hitachi High-Technologies Corporation as the scanning electron microscope.

In addition, the matrix of the light scattering layer indicates a portion of the light scattering layer excluding particles having a particle size of greater than or equal to 0.1 μm. Light scattering of the light scattering layer is caused by optical inhomogeneity in the layer. Particles having a sufficiently small particle size do not considerably decrease the optical homogeneity of the layer even in a case where the particles are contained in the layer, whereas particles having a particle size of greater than or equal to 0.1 μm are particles which cause the layer to be optically inhomogeneous, and thus, can cause the light scattering. Hereinafter, the particles having a particle size of greater than or equal to 0.1 μm will be referred to as light scattering particles. Then, a layer containing the light scattering particles is set to the light scattering layer of the present invention. The average refractive index n2 of the matrix of the light scattering layer is a value obtained with respect to a matrix for measurement prepared by excluding the light scattering particles from a material for forming a light scattering layer. Furthermore, a matrix composition of the light scattering layer can be obtained by a known composition analysis method such as infrared spectroscopy, nuclear magnetic resonance (NMR) measurement, and gas chromatography measurement of a solution obtained by dissolving the matrix of the light scattering layer in an arbitrary solvent which can dissolve the matrix of the light scattering layer.

The average refractive index of the present invention indicates an average value of a refractive index nx in an in-plane slow axis direction, a refractive index ny in an in-plane fast axis direction which is a direction orthogonal to the slow axis direction, and a refractive index nz in a direction orthogonal to the slow axis direction and the fast axis direction.

The refractive indices nx and ny can be measured by a known refractive index measurement device. Examples of the refractive index measurement device can include a multiwavelength ABBE'S REFRACTOMETER DR-M2 manufactured by ATAGO CO., LTD. On the other hand, the refractive index nz can be calculated as described below from values of the thickness of the layer, retardation in an in-plane direction, and the refractive indices nx and ny.

On the other hand, in a case where there is no slow axis, an average value of a refractive index in an in-plane direction, a refractive index in a thickness direction, and a refractive index in a direction orthogonal to the in-plane direction and the thickness direction is set to the average refractive index. In this case, the average refractive index in each of the directions can be obtained by a known refractive index measurement device, for example, the multiwavelength ABBE'S REFRACTOMETER DR-M2 manufactured by ATAGO CO., LTD. described above.

In addition, the light absorptivity of the light scattering layer at a wavelength of λ nm is obtained by an optical system using an integrating sphere. An incidence ray is transmitted through a sample a plurality of times by using the integrating sphere, and thus, a small absorbed amount can also be quantitated. For example, a commercially available device, by which an absolute light emitting quantum yield measurement method using an integrating sphere can be performed, can be used as a measurement device. Examples of the measurement device can include an absolute photoluminescence (PL) quantum yield measurement device (C9920-02) manufactured by Hamamatsu Photonics K.K., and in the examples described below, the measurement device is used.

In one embodiment, the light scattering layer is disposed on an exiting side from the wavelength conversion layer (that is, on a liquid crystal cell side in a state of being disposed on the liquid crystal display device).

In one embodiment, the fluorescent material is a quantum dot.

In one embodiment, the average refractive index n2 of the matrix of the light scattering layer is in a range of 1.45 to 2.00, and satisfies the relationship of n1<n2.

In one embodiment, the average refractive index n1 of the wavelength conversion layer is in a range of 1.43 to 1.60, and satisfies the relationship of n1<n2.

In one embodiment, the wavelength conversion layer and the light scattering layer are laminated through a barrier film.

In one embodiment, the barrier film includes at least an inorganic layer.

In one embodiment, the inorganic layer is an inorganic layer containing at least one type selected from the group consisting of a silicon oxide, a silicon nitride, a silicon carbide, and an aluminum oxide.

In one embodiment, the inorganic layer, an organic layer, and a base material film are adjacently arranged in the barrier film in this order from a wavelength conversion layer side towards a light scattering layer side. Here, "being adjacent to something" indicates that being directly in contact with something without other layers.

In one embodiment, the wavelength of λ nm is in a wavelength range of blue light.

Another aspect of the present invention relates to a liquid crystal display device, comprising: the backlight unit described above; and a liquid crystal cell.

Still another aspect of the present invention relates to a wavelength conversion member, comprising: a wavelength conversion layer containing a fluorescent material which is excited by exciting light and emits fluorescent light; and a light scattering layer containing particles having a particle size of greater than or equal to 0.1 μm in a matrix, in which an average refractive index n1 of the wavelength conversion layer satisfies a relationship of n1<n2 with respect to an average refractive index n2 of the matrix of the light scattering layer, and a light absorptivity of the light scattering layer at a wavelength of 450 nm is less than or equal to 8.0%.

According to the present invention, it is possible to provide a liquid crystal display device which can display an image having a high brightness. Further, according to the present invention, it is possible to provide a wavelength conversion member and a backlight unit which can provide such a liquid crystal display device.

DESCRIPTION OF THE PREFERRED EMBODIMENTS

Figure 1A:
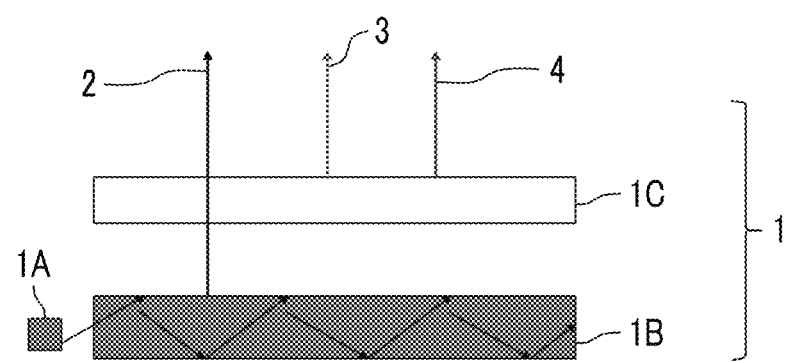
FIGS. 1A and 1B are explanatory diagrams of an example of a backlight unit including a wavelength conversion member.

The following description is based on representative embodiments of the present invention, but the present invention is not limited to such embodiments. Furthermore, in the present invention and in this specification, a numerical range represented by using "to" indicates a range including numerical values before and after "to" as the lower limit value and the upper limit value.

In the present invention and in this specification, a "half-width" of a peak indicates the width of a peak at a height of ½ of a peak height. In addition, light having a light emission center wavelength in a wavelength range of 430 to 480 nm will be referred to as blue light, light having a light emission center wavelength in a wavelength range of 520 to 560 nm will be referred to as green light, and light having a light emission center wavelength in a wavelength range of 600 to 680 nm will be referred to as red light. Ultraviolet light indicates light having a light emission center wavelength in a wavelength range of 300 nm to 430 nm. Then, a light source allowing blue light to exit as light having a single peak will be referred to as a blue light source, and a light source allowing ultraviolet light to exit as light having a single peak will be referred to as an ultraviolet light source. Here, emitting the light having a single peak indicates that only one peak, in which absorption of a light emission center wavelength is maximized, exists in a light emission spectrum, not but two or more peaks appear as with a white light source.

[Backlight Unit and Wavelength Conversion Member]

A backlight unit of the present invention is a backlight unit, including a light source allowing light having a light emission center wavelength of λ nm to exit; and a wavelength conversion member positioned on an optical path of the light exiting form the light source, in which the wavelength conversion member includes a wavelength conversion layer containing a fluorescent material which is excited by exciting light and emits fluorescent light, and a light scattering layer containing particles having a particle size of greater than or equal to 0.1 μm in a matrix, an average refractive index n1 of the wavelength conversion layer satisfies a relationship of n1<n2 with respect to an average refractive index n2 of the matrix of the light scattering layer, and a light absorptivity of the light scattering layer at a wavelength of λ nm is less than or equal to 8.0%.

As a result of intensive studies of the present inventors for attaining the objects described above, the backlight unit of the present invention has been found. Hereinafter, this point will be further described.

As described above, the present inventors have considered having a function of scattering light in a portion separated from the wavelength conversion layer as effective means for improving a brightness. For this reason, the backlight unit includes the light scattering layer. The present inventors have assumed the reason that the brightness can be improved by the light scattering layer is because it is possible to attain any one or both of:

(1) increasing a light emission efficiency of the fluorescent material of the wavelength conversion layer; and (2) allowing the fluorescent light emitted from the fluorescent material to efficiently exit from the backlight unit. Specifically, the reason is as follows.

The light scattering layer can be disposed on at least one of an exiting side or a light source side of the wavelength conversion layer. The light scattering layer disposed on the exiting side can scatter light exiting from the wavelength conversion layer in various directions. In exiting light from the light source (hereinafter, also referred to as "light derived from a light source"), in general, a part of the exiting light is absorbed in the fluorescent material of the wavelength conversion layer and excites the fluorescent material, but a part of the exiting light passes through the wavelength conversion layer and exits from the wavelength conversion layer. Allowing the light derived from the light source which exits as described above to be incident again on the wavelength conversion layer increases the amount of exciting light which incident on the wavelength conversion layer, and thus, increases the light emission efficiency of the fluorescent material. Regarding this point, as described above, it is considered that the light scattering layer disposed on the wavelength conversion layer on the exiting side scatters the light derived from the light source which exits from the wavelength conversion layer and changes a travelling direction of the light, and thus, can have a function of returning a part of the light to the wavelength conversion layer side. Thus, it is assumed that the light derived from the light source which has returned to the wavelength conversion layer excites the fluorescent material in the wavelength conversion layer, and thus, it is possible to increase the amount of light emitted from the fluorescent material. In addition, it is assumed that the light scattering layer disposed on the wavelength conversion layer on the light source side can also have a function of returning light transmitted through the wavelength conversion layer in the light derived from the light source which has been reflected on a reflection member such as a prism sheet, which can be disposed on the wavelength conversion layer on the exiting side in the backlight unit again to the wavelength conversion layer side, and thus, can increase the amount of emitted light of the fluorescent material.

In addition, the fluorescent material, in general, isotropically emits the fluorescent light, and thus, a part of the fluorescent light emitted in the wavelength conversion layer (hereinafter, also referred to as "light derived from the wavelength conversion layer") is totally reflected on a refractive index interface, and is guided into the wavelength conversion member without being taken out to the exiting side. It is considered that the light scattering layer disposed on the wavelength conversion layer on the exiting side or the light source side can have a function of taking out the light to the outside of the wavelength conversion member by repeating the total reflection and by changing a travelling direction of the guided light. According to this, it is assumed that it is possible to increase the amount of light derived from the wavelength conversion layer which exits from the backlight unit.

Thus, the present inventors have considered that the light scattering layer contributes to attainment of improving the brightness by (1) and (2) described above.

Here, simply scattering particles as illustrated in FIGS. 29 to 31 of JP2013-544018A, is also considered as means for arranging light scattering particles in the portion separated from the wavelength conversion layer, but in order to obtain an effect of more evenly scattering the particles by light exiting from the entire surface of the wavelength conversion layer on the exiting side, it is preferable that the particles are arranged as a member containing light scattering particles in a matrix (the light scattering layer). Here, in a case where the refractive index n2 of the matrix of the light scattering layer is lower than the refractive index n1 of the wavelength conversion layer (n1>n2), in a case where the light scattering layer is in contact with the wavelength conversion layer, the total reflection occurs on an interface between the two layers or in a case a layer having a refractive index different from that of a base material or the like exists between the light scattering layer and the wavelength conversion layer, the total reflection occurs on at least one interface of interfaces of two layers having different refractive indices, among a plurality of layers existing between the wavelength conversion layer and the light scattering layer, and thus, the light is hindered from being incident on the light scattering layer. Therefore, the present inventors have disposed the light scattering layer satisfying the relationship of n1<n2 in order to suppress the total reflection.

In addition, for (1) described above (increasing the light emission efficiency of the fluorescent material in the wavelength conversion layer), the present inventors have set a light absorptivity of the light derived from the light source at the light emission center wavelength of λ nm to be less than or equal to 8.0% in the light scattering layer, in order to reduce a loss due to absorption of the exciting light (the light derived from the light source) of the light scattering layer.

According to a liquid crystal display device incorporated with the backlight unit described above, which has been found by the result of the intensive studies of the present inventors as described above, it is possible to obtain an image having a high brightness.

However, the above description includes the assumptions of the present inventors, and does not limit the present invention.

Further, the present invention also provides a wavelength conversion member, including: a wavelength conversion layer containing a fluorescent material which is excited by exciting light and emits fluorescent light; and a light scattering layer containing particles having a particle size of greater than or equal to 0.1 μm in a matrix, in which an average refractive index n1 of the wavelength conversion layer satisfies a relationship of n1<n2 with respect to an average refractive index n2 of the matrix of the light scattering layer, and a light absorptivity of the light scattering layer at a wavelength of 450 nm is less than or equal to 8.0%, as a wavelength conversion member suitable for a backlight unit using a blue light source as a light source. Furthermore the wavelength of 450 nm is indicated as a representative value of a center light emission wavelength of the blue light source, but the center light emission wavelength of the blue light source in the present invention is not limited to 450 nm.

Hereinafter, the backlight unit and the wavelength conversion member described above will be described in more detail.

<Light Absorptivity of Light Scattering Layer at Wavelength of λ nm>

The wavelength conversion member described above includes a light scattering layer having a light absorptivity at a light emission center wavelength of λ nm of the light source is less than or equal to 8.0%, as the light scattering layer, in order to reduce the loss of the light derived from the light source as described above. The light absorptivity described above is preferably less than or equal to 7.0%, is more preferably less than or equal to 5.0%, is even more preferably less than or equal to 3.0%, is still more preferably less than or equal to 2.5%, and is further more preferably less than or equal to 2.0%. The light absorptivity described above, for example, is greater than or equal to 0.01%, and it is preferable that the light absorptivity is low, and thus, the lower limit is not particularly limited. Furthermore, a measurement method of the light absorptivity described above is as described above.

In a case where the light source included in the backlight unit is a blue light source, the wavelength of λ nm is in a wavelength range of blue light. In addition, in a case where the light source is an ultraviolet light source, the wavelength of λ nm is in a wavelength range of ultraviolet light. The light absorptivity described above of the matrix of the light scattering layer, for example, can be controlled by a formulation of a composition used for forming the light scattering layer.

<Average Refractive Indices n1 and n2>

In addition, from the reason described above, in the wavelength conversion member described above, the average refractive index n1 of the wavelength conversion layer and the average refractive index n2 of the matrix of the light scattering layer satisfy the relationship of n1<n2. For example, in a case where a difference between n1 and n2 is set to Δn=n2−n1, Δn can be greater than or equal to 0.001, and can also be greater than or equal to 0.010, as an example. Here, in a case of n1<n2, the total reflection described above can be effectively suppressed, and thus, Δn is not limited insofar as satisfying the relationship of n1<n2.

The average refractive index n2 of the matrix of the light scattering layer may satisfy the relationship of n1<n2. For example, n2 is in a range of 1.45 to 2.00, is preferably in a range of 1.48 to 1.85, and is more preferably in a range of 1.50 to 1.80.

On the other hand, the average refractive index n1 of the wavelength conversion layer, for example, is in a range of 1.43 to 1.60, but is not limited to the range described above insofar as satisfying the relationship of n1<n2.

n1 and n2 described above can be adjusted by formulations of a composition used for forming the wavelength conversion layer and the composition used for forming the light scattering layer.

Furthermore, the average refractive index, as described above, is the average value of the of the refractive index nx in the in-plane slow axis direction, the refractive index ny in the in-plane fast axis direction which is the direction orthogonal to the slow axis direction, and the refractive index nz in the direction orthogonal to the slow axis direction and the fast axis direction. The slow axis is determined by a known phase difference measurement device. For example, phase difference measurement devices KOBRA CCD series and KOBRA 21ADH or WR series, manufactured by Oji Scientific Instruments, can be used as the phase difference measurement device. As described above, nx and ny can be measured by the known refractive index measurement device.

On the other hand, the refractive index nz can be obtained from retardation Re in an in-plane direction, a layer thickness d, and nx and ny. The retardation Re in the in-plane direction is retardation which is measured by allowing light at a wavelength of λ nm to be incident in a normal direction with respect to a surface of a layer, by using a known phase difference measurement device. In the present invention, 589 nm is adopted as the wavelength of λ nm. In selection of a measurement wavelength of λ nm, measurement can be performed by manually exchanging a wavelength selective filter or by converting a measured value with a program or the like. Furthermore, the refractive index indicates a refractive index with respect to light at a wavelength of 589 nm.

The refractive index nz in the direction orthogonal to the in-plane slow axis direction and the fast axis direction can be calculated from the retardation Re in the in-plane direction, a layer thickness d, and values of the refractive index nx in the in-plane slow axis direction and the refractive index ny in the in-plane fast axis direction. Furthermore, the layer thickness can be obtained by observing a cross-sectional surface with a microscope such as an optical microscope and a scanning electron microscope (SEM).

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^3}} \right] \times \frac{d}{\cos\left(\sin^{-1}\left(\frac{\sin(-\theta)}{nx}\right)\right)}$$

Expression (1)

Re (θ) described above indicates a retardation value in a direction tilted from a normal direction of a layer which is a measurement target, by an angle of θ°. Therefore, in the retardation in the in-plane direction, θ is 0°.

In addition, in the present invention and in this specification, the description about an angle such as orthogonal includes an error range which is allowed in the technical field of the present invention. For example, the angle indicates that the angle is in a range of less than an exact angle ±10°, and an error from the exact angle is preferably less than or equal to 5°, and is more preferably less than or equal to 3°.

<Configuration and Arrangement Example of Wavelength Conversion Member>

The wavelength conversion member may have a function of converting at least a part of a wavelength of an incidence ray and of allowing light having a wavelength different from the wavelength of the incidence ray to exit. The shape of the wavelength conversion member is not particularly limited, and can have an arbitrary shape such as a sheet and a bar. The wavelength conversion member can be used as a constituent of a backlight unit of a liquid crystal display device.

Figure 1B:
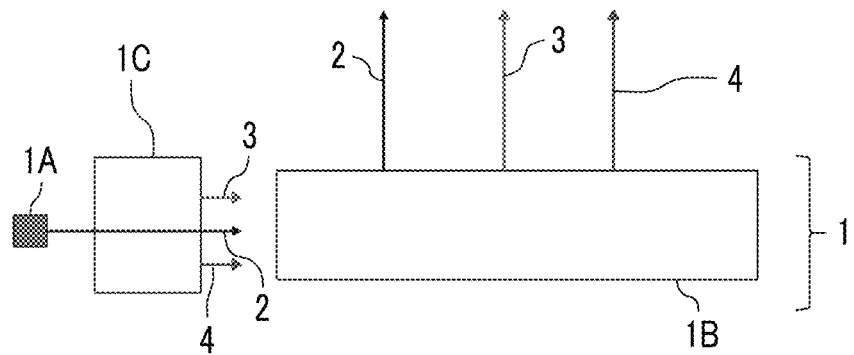
Figure 2A:
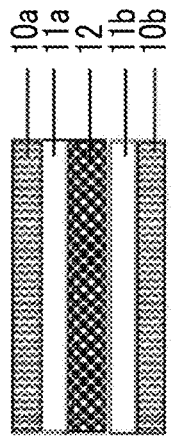
FIGS. 2A to 2F illustrate specific examples of a layer configuration of the wavelength conversion member.
Figure 2B:
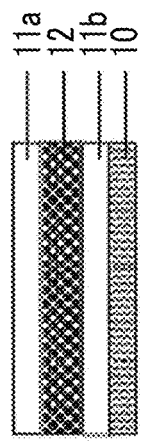
Figure 2C:
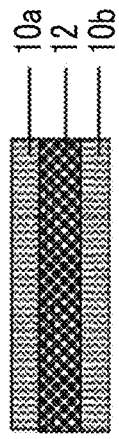
Figure 2D:
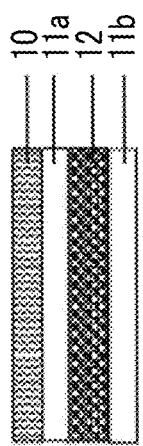
Figure 2E:
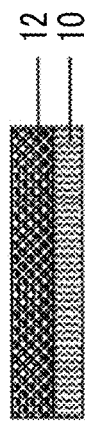
Figure 2F:
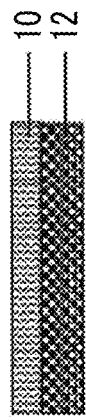

FIGS. 1A and 1B are explanatory diagrams of an example of a backlight unit 1 including the wavelength conversion member. In FIGS. 1A and 1B, the backlight unit 1 includes a light source 1A, and a light guide plate 1B for being used as a plane light source. In the example illustrated in FIG. 1A, the wavelength conversion member is disposed on a path of light exiting from the light guide plate. On the other hand, in the example illustrated in FIG. 1B, the wavelength conversion member is disposed between the light guide plate and the light source. Then, in the example illustrated in FIG. 1A, light exiting from the light guide plate 1B is incident on a wavelength conversion member 1C.

In the example illustrated in FIG. 1A, light 2 exiting from the light source 1A disposed on an edge portion of the light guide plate 1B is blue light, and exits towards a liquid crystal cell (not illustrated) from the surface of the light guide plate 1B on the liquid crystal cell side. The wavelength conversion member 1C disposed on a path of the light (the blue light 2) exiting from the light guide plate 1B includes at least a quantum dot (A) which is excited by the blue light 2 and emits red light 4, and a quantum dot (B) which is excited by the blue light 2 and emits green light 3. Thus, the green light 3 and the red light 4 which are excited, and the blue light 2 which is transmitted through the wavelength conversion member 1C exit from the backlight unit 1. Thus, the red light, the green light, and the blue light are emitted, and thus, white light can be realized.

The example illustrated in FIG. 1B is identical to the aspect illustrated in FIG. 1A except that the arrangement of the wavelength conversion member and the light guide plate is different. In the example illustrated in FIG. 1B, the green light 3 and the red light 4 which are excited, and the blue light 2 which is transmitted through the wavelength conversion member 1C exit from the wavelength conversion member 1C and are incident on the light guide plate, and thus, a plane light source is realized.

<Light Scattering Layer>

(Light Scattering Particles)

The light scattering layer is a layer containing light scattering particles in a matrix. A particle size of the light scattering particles is greater than or equal to 0.1 µm, is preferably in a range of 0.5 to 15.0 µm, and is more preferably in a range of 0.7 to 12.0 µm, from the viewpoint of a scattering effect.

In addition, in order to further improve a brightness or to adjust a brightness distribution with respect to a view angle, two or more types of light scattering particles having different particle sizes may be used by being mixed. In a case where particles having a large particle size are referred to as particles having a large particle diameter, and particles having a particle size smaller than that of the particles having a large particle diameter are referred to as particles having a small particle diameter, the particle size of the particles having a large particle diameter is preferably in a range of 5.0 µm to 15.0 µm, and is more preferably in a range of 6.0 µm to 12.0 µm, from the viewpoint of imparting external scattering properties and anti-Newton ring properties. In addition, the particle size of the particles having a small particle diameter is preferably in a range of 0.5 µm to 5.0 µm, and is more preferably in a range of 0.7 µm to 3.0 µm, from the viewpoint of imparting internal scattering properties.

The light scattering particles may be organic particles, may be inorganic particles, or may be organic inorganic composite particles. For example, synthetic resin particles can be used as the organic particles. Specific examples of the synthetic resin particles include silicone resin particles, acrylic resin particles (polymethyl methacrylate (PMMA)), nylon resin particles, styrene resin particles, polyethylene particles, urethane resin particles, benzoguanamine particles, and the like, and the silicone resin particles and the acrylic resin particles are preferable from the viewpoint of easy availability of particles having a preferred refractive index. In addition, particles having a hollow structure can also be used.

It is preferable that a refractive index difference between the light scattering particles and the matrix of the light scattering layer is large from the viewpoint of the scattering effect. From this point, a refractive index difference $\Delta n$ between the light scattering particles and the matrix is preferably greater than or equal to 0.02, is more preferably greater than or equal to 0.10, and is even more preferably greater than or equal to 0.20. A refractive index of the light scattering particles, for example, is in a range of 1.40 to 1.45, and is preferably in a range of 1.42 to 1.45. Here, the refractive index also indicates the average refractive index described above. Furthermore, the same applies to a "refractive index" described below.

It is preferable that the light scattering particles are contained in the light scattering layer at a volume fraction of 10 volume % (vol %) to 70 vol %, and it is more preferable that the light scattering particles are contained in the light scattering layer at a volume fraction of 20 vol % to 60 vol %, from the viewpoint of light scattering properties of the light scattering layer and from the viewpoint of a brittleness of the light scattering layer.

(Matrix of Light Scattering Layer)

A formation method of the light scattering layer is not particularly limited, and it is preferable that the light scattering layer is formed as a cured layer of a polymerizable composition (a curable composition) containing the light scattering particles and a polymerizable compound, from the viewpoint of productivity or the like. A suitable polymerizable compound may be used as the polymerizable compound described above by being selected from commercially available products or polymerizable compounds synthesized by a known method, in consideration of a refractive index of a material forming the wavelength conversion layer to satisfy $n1<n2$. Examples of a preferred polymerizable compound can include a compound having an ethylenically unsaturated bond on at least one of a terminal or a side chain, and/or a compound having an epoxy group or an oxetane group on at least one of a terminal or a side chain, and the compound having an ethylenically unsaturated bond on at least one of a terminal or a side chain is more preferable. Specific examples of the compound having an ethylenically unsaturated bond on at least one of a terminal or a side chain include a (meth)acrylate-based compound, an acrylamide based compound, a styrene-based compound, a maleic anhydride, and the like, the (meth)acrylate based compound is preferable, and the acrylate-based compound is more preferable. (Meth)acrylate, urethane (meth)acrylate, polyester (meth)acrylate, epoxy (meth)acrylate, or the like is preferable as the (meth)acrylate-based compound. Styrene, α-methyl styrene, 4-methyl styrene, divinyl benzene, 4-hydroxy styrene, 4-carboxy styrene, or the like is preferable as the styrene-based compound.

Furthermore, in the present invention and in this specification, "(meth)acrylate" is used as the meaning of any one or both of acrylate and methacrylate, and a "(meth)acrylic acid" is used as the meaning of any one or both of an acrylic acid and a methacrylic acid. The same applies to "(meth)acryloyl" or the like.

In the (meth)acrylate-based compound, examples of a compound which is preferably used for further decreasing the light absorptivity of the light scattering layer at the light emission center wavelength of $\lambda$ nm of the light source, can include difunctional or higher polyfunctional (meth)acrylate which is ester of polyhydric alcohol and a polyfunctional (meth)acrylic acid.

Preferred examples of difunctional (meth)acrylate include neopentyl glycol di(meth)acrylate, 1,6-hexane diol di(meth)acrylate, 1,9-nonane diol di(meth)acrylate, tripropylene glycol di(meth)acrylate, ethylene glycol di(meth)acrylate, triethylene glycol di(meth)acrylate, tetraethylene glycol di(meth)acrylate, hydroxy pivalic acid neopentyl glycol di(meth)acrylate, polyethylene glycol di(meth)acrylate, dicyclopentenyl (meth)acrylate, dicyclopentenyloxy ethyl (meth)acrylate, dicyclopentanyl di(meth)acrylate, and the like.

Preferred examples of trifunctional or higher (meth)acrylate include epichlorohydrin (ECH) denatured glycerol tri(meth)acrylate, ethylene oxide (EO) denatured glycerol tri(meth)acrylate, propylene oxide (PO) denatured glycerol tri(meth)acrylate, pentaerythritol triacrylate, pentaerythritol tetraacrylate, EO denatured phosphoric acid triacrylate, trimethylol propane tri(meth)acrylate, caprolactone denatured trimethylol propane tri(meth)acrylate, EO denatured trimethylol propane tri(meth)acrylate, PO denatured trimethylol propane tri(meth)acrylate, tris(acryloxy ethyl) isocyanurate, dipentaerythritol hexa(meth)acrylate, dipentaerythritol penta(meth)acrylate, caprolactone denatured dipentaerythritol hexa(meth)acrylate, dipentaerythritol hydroxy penta(meth)acrylate, alkyl denatured dipentaerythritol penta(meth)acrylate, dipentaerythritol poly(meth)acrylate, alkyl denatured dipentaerythritol tri(meth)acrylate, ditrimethylol propane tetra(meth)acrylate, ethoxylated pentaerythritol tetra(meth)acrylate, pentaerythritol tetra(meth)acrylate, and the like.

It is preferable that the (meth)acrylate-based compound is used together with (1) and (2) described below, from the viewpoint of improving a hardness of the light scattering layer and adhesiveness with respect to the adjacent layer or the adjacent member.

(1) At least one type of (meth)acrylate selected from the group consisting of difunctional (meth)acrylate in which an alkyl group having 5 to 9 carbon atoms is linked between (meth)acrylates and difunctional or trifunctional or higher (meth)acrylate in which alkylene oxide is linked between (meth)acrylates; and (2) at least one type of trifunctional or higher (meth)acrylate not containing alkylene oxide.

Examples of the urethane (meth)acrylate can include (urethane) methacrylate obtained by a reaction of diisocyanato such as tolylene diisocyanato (TDI), diphenyl methane diisocyanato (MDI), hexamethylene diisocyanato (HDI), isophorone diisocyanato (IPDI), and dicyclohexyl methane diisocyanato (HMDI), polyol such as poly(propylene oxide) diol, poly(tetramethylene oxide) diol, ethoxylated bisphenol A, ethoxylated bisphenol S spiroglycol, caprolactone denatured diol, and carbonate diol, and hydroxy acrylate such as 2-hydroxy ethyl (meth)acrylate, 2-hydroxy propyl (meth)acrylate, glycidol di(meth)acrylate, and pentaerythritol triacrylate. Specific examples of the (urethane) methacrylate can include polyfunctional urethane (meth)acrylate described in JP2002-265650A, JP2002-355936A, JP2002-067238A, or the like. In addition, other specific examples of the (urethane) methacrylate can include an adduct of TDI and hydroxy ethyl acrylate, an adduct of IPDI and hydroxy ethyl acrylate, an adduct of HDI and pentaerythritol triacrylate (PETA), a compound obtained of a reaction between isocyanato and dodecyloxy hydroxy propyl acrylate remaining after preparing an adduct of TDI and PETA, an adduct of 6,6-nylon and TDI, an adduct of pentaerythritol, TDI, and hydroxy ethyl acrylate, and the like. Among them, in order to further decrease the light absorptivity of the light scattering layer at the light emission center wavelength of $\lambda$ nm of the light source, (urethane) methacrylate which is generated by condensation between a compound having a hydroxyl group and aliphatic isocyanate is preferable.

In addition, in order to retain the light absorptivity of the light scattering layer at the light emission center wavelength of $\lambda$ nm of the light source to be low even after the wavelength conversion member is used for a long period of time, it is preferable that at least one type selected from urethane (meth)acrylate, a phenolic compound, a phosphorous acid triester compound, a sulfur-based compound, and a hindered amine-based compound is used together. It is preferable that the light absorptivity of the light scattering layer at the light emission center wavelength of $\lambda$ nm of the light source can be retained to be low even after the wavelength conversion member is used for a long period of time, since a decrease in the brightness due to use for a long period of time is suppressed (that is, durability is improved).

Examples of a phenolic compound include 2,6-ditertiary butyl-p-cresol, 2,6-diphenyl-4-octadecyloxy phenol, stearyl (3,5-ditertiary butyl-4-hydroxy phenyl)-propionate, distearyl (3,5-ditertiary butyl-4-hydroxy benzyl) phosphonate, thiodiethylene glycol bis[(3,5-ditertiary butyl-4-hydroxy phenyl) propionate], 1,6-hexamethylene bis[(3,5-ditertiary butyl-4-hydroxy phenyl) propionate], 1,6-hexamethylene bis[(3,5-ditertiary butyl-4-hydroxy phenyl) propionic acid amide], 4,4'-thiobis(6-tertiary butyl-m-cresol), 2,2'-methylene bis(4-methyl-6-tertiary butyl phenol), 2,2'-methylene bis(4-ethyl-6-tertiary butyl phenol), bis[3,3-bis(4-hydroxy-3-tertiary butyl phenyl)butyric acid]glycol ester, 4,4'-butylidene bis(6-tertiary butyl-m-cresol), 2,2'-ethylidene bis(4,6-ditertiary butyl phenol), 2,2'-ethylidene bis(4-second butyl-6-tertiary butyl phenol), 1,1,3-tris(2-methyl-4-hydroxy-5-tertiary butyl phenyl) butane, bis[2-tertiary butyl-4-methyl-6-(2-hydroxy-3-tertiary butyl-5-methyl benzyl) phenyl] terephthalate, 1,3,5-tris(2,6-dimethyl-3-hydroxy-4-tertiary butyl benzyl) isocyanurate, 1,3,5-tris(3,5-ditertiary butyl-4-hydroxy benzyl) isocyanurate, 1,3,5-tris(3,5-ditertiary butyl-4-hydroxy benzyl)-2,4,6-trimethyl benzene, 1,3,5-tris[(3,5-ditertiary butyl-4-hydroxy phenyl) propionyloxy ethyl] isocyanurate, tetrakis[methylene-3-(3',5'-ditertiary butyl-4'-hydroxy phenyl) propionate] methane, 2-tertiary butyl-4-methyl-6-(2-acryloyloxy-3-tertiary butyl-5-methyl benzyl) phenol, 3,9-bis[1,1-dimethyl-2-{(3-tertiary butyl-4-hydroxy-5-methyl phenyl) propionyloxy} ethyl]-2,4,8,10-tetraoxaspiro[5.5]undecane, tetrakis(3-(3,5-di-tertiary butyl-4-hydroxy phenyl) propionate) methane, triethylene glycol bis[(3-tertiary butyl-4-hydroxy-5-methyl phenyl) propionate], 2-[1-(2-hydroxy-3,5-ditertiary pentyl phenyl) ethyl]-4,6-ditertiary pentyl phenyl acrylate, and the like.

Examples of the phosphorous acid triester compound include triphenyl phosphite, trisnonyl phenyl phosphite, tricresyl phosphite, tris(2-ethyl hexyl) phosphite, tridecyl phosphite, trilauryl phosphite, tris(tridecyl) phosphite, trioleyl phosphite, diphenyl mono(2-ethyl hexyl) phosphite, diphenyl monodecyl phosphite, diphenyl mono(tridecyl) phosphite, trilauryl trithiophosphite, tetraphenyl dipropylene glycol diphosphite, tetraphenyl (tetratridecyl) pentaerythritol tetraphosphite, tetra(alkyl having 12 to 15 carbon atoms)-4,4'-isopropylidene diphenyl phosphite, a mixture of bis(tridecyl) pentaerythritol diphosphite and bis (nonyl phenyl) pentaerythritol diphosphite, bis(decyl) pentaerythritol diphosphite, bis(tridecyl) pentaerythritol diphosphite, tristearyl phosphite, distearyl pentaerythritol diphosphite, tris(2,4-di-tert-butyl phenyl) phosphite, a hydrogenerated bisphenol A and pentaerythritol phosphite polymer, a hydrogenerated bisphenol A and phenyl phosphite polymer, 2,2'-methylene bis(4,6-di-tert-butyl phenyl)-2-ethyl hexyl phosphite, bis(2,4-di-tert-butyl phenyl) pentaerythritol diphosphite, bis(2,6-di-tert-butyl-4-methyl phenyl) pentaerythritol diphosphate, 6-tert-butyl-4-[3-(2,4, 8,10-tetra-tert-butyl dibenzo[d,f][1,3,2]dioxaphosphepin-6-yloxy) propyl]-o-cresol, and the like.

Examples of the sulfur-based compound include dialkyl thiodipropionates such as thiodipropionic acid dilauryl, dimyristyl, and distearyl, and β-alkyl mercaptopropionic acid esters of polyol, such as pentaerythritol tetra(β-dodecyl mercaptopropionate).

In addition, examples of the hindered amine-based compound include 2,2,6,6-tetramethyl-4-piperidyl benzoate, N-(2,2,6,6-tetramethyl-4-piperidyl) dodecyl succinic acid imide, 1-[(3,5-ditertiary butyl-4-hydroxy phenyl) propionyloxy ethyl]-2,2,6,6-tetramethyl-4-piperidyl-(3,5-ditertiary butyl-4-hydroxy phenyl) propionate, bis(2,2,6,6-tetramethyl-4-piperidyl) sebacate, bis(1,2,2,6,6-pentamethyl-4-piperidyl) sebacate, bis(1,2,2,6,6-pentamethyl-4-piperidyl)-2-butyl-2-(3,5-ditertiary butyl-4-hydroxy benzyl) malonate, N,N'-bis(2,2,6,6-tetramethyl-4-piperidyl) hexamethylene diamine, tetra(2,2,6,6-tetramethyl-4-piperidyl) butane tetracarboxylate, tetra(1,2,2,6,6-pentamethyl-4-piperidyl) butane tetracarboxylate, bis(2,2,6,6-tetramethyl-4-piperidyl) .di(tridecyl) butane tetracarboxylate, bis(1,2,2,6,6-pentamethyl-4-piperidyl).di(tridecyl) butane tetracarboxylate, 3,9-bis[1,1-dimethyl-2-{tris(2,2,6,6-tetramethyl-4-piperidyloxy carbonyloxy) butyl carbonyloxy} ethyl]-2,4,8,10-tetraoxaspiro[5.5]undecane, 3,9-bis[1,1-dimethyl-2-{tris(1,2,2,6,6-pentamethyl-4-piperidyloxy carbonyloxy) butyl carbonyloxy} ethyl]-2,4,8,10-tetraoxaspiro[5.5]undecane, 1,5,8,12-tetrakis[4,6-bis {N-(2,2,6,6-tetramethyl-4-piperidyl) butyl amino}-1,3,5-triazine-2-yl]-1,5,8,12-tetraazadodecane, 1-(2-hydroxy ethyl)-2,2,6,6-tetramethyl-4-piperidinol/succinic acid dimethyl condensate, 2-tertiary octyl amino-4,6-dichloro-s-triazine/N,N'-bis(2,2,6,6-tetramethyl-4-piperidyl) hexamethylene diamine condensate, N,N'-bis(2,2,6,6-tetramethyl-4-piperidyl) hexamethylene diamine/ dibromoethane condensate, and the like.

Among the stabilizers described above, the phenolic compound or the hindered amine-based compound is preferable, and the phenolic compound is more preferable. The content of the stabilizer in the light scattering layer is preferably 0.02 to 10 parts by mass, is more preferably 0.05 to 5 parts by mass, and is even more preferably 0.1 to 3 parts by mass, with respect to 100 parts by mass of the matrix of the light scattering layer. Two or more plurality of types of stabilizers may be used together, and in a case where a plurality of types of stabilizers are used together, the content of each of the stabilizers can be set to be in the range described above. It is preferable that the content of the stabilizer is set to be in the range described above, from the viewpoint of curing properties of the light scattering layer, the adhesiveness with respect to the adjacent layer or the adjacent member, and enablement of retaining the light absorptivity of the light scattering layer at the light emission center wavelength of λ nm of the light source to be low even after the wavelength conversion member is used for a long period of time.

In addition, a compound having a fluorene skeleton is also preferably used as the acrylate-based compound. Specific examples of such a compound include a compound represented by Formula (2) described in WO2013/047524A1.

Further, in order to adjust the refractive index of the matrix, particles having a particle size smaller than that of the light scattering particles can be used as refractive index adjustment particles. A particle size of the refractive index adjustment particles is less than 0.1 μm.

Examples of the refractive index adjustment particles include particles of diamond, titanium oxide, zirconium oxide, lead oxide, lead carbonate, zinc oxide, zinc sulfide, antimony oxide, silicon oxide, aluminum oxide, and the like. Among them, particles of zirconium oxide or silicon oxide are preferable from the viewpoint of small absorption of blue light or ultraviolet light, and particles of zirconium oxide are preferable since a refractive index can be adjusted in a small amount. The refractive index adjustment particles may be used in an amount in which the refractive index can be adjusted, and the content of the refractive index adjustment particles in the light scattering layer is not particularly limited.

Further, one or more types of known additives such as a polymerization initiator and a surfactant, or one or more types of solvents for adjusting a viscosity or the like can also be added to the polymerizable composition for forming the light scattering layer in an arbitrary amount. A known additive and a known solvent can be used as the additive and the solvent without any limitation.

By adjusting types or added amounts of various components described above, it is possible to control the refractive index n2 of the matrix of the light scattering layer and the light absorptivity of the light scattering layer at the wavelength of λ nm.

(Arrangement Position, Thickness, and Formation Method of Light Scattering Layer)

In the wavelength conversion member, the light scattering layer may be disposed on the exiting side from the wavelength conversion layer, may be disposed on the light source side, may be disposed on any one of the exiting side and the light source side, or may be disposed on both of the exiting side and the light source side. In addition, the light scattering layer may be disposed as a layer which is directly in contact with the wavelength conversion layer, or may be laminated on the wavelength conversion layer through one or more other layers. Examples of such other layers can include an organic layer, an inorganic layer, and a base material film, which are included in a barrier film described below. FIGS. 2A to 2F illustrate specific examples of a layer configuration of the wavelength conversion layer. In FIGS. 2A to 2F, an upper side indicates the exiting side, a lower side indicates the light source side, reference numerals 10, 10a, and 10b indicate light scattering layers, reference numerals 11a and 11b indicate barrier films, and a reference numeral 12 indicates the wavelength conversion layer. Furthermore, a layer configuration of the barrier film is not illustrated for the sake of simplicity. As described below, the barrier film can have a laminated structure of two or more layers, and it is preferable that the barrier film can have a laminated structure. Furthermore, FIGS. 2A to 2F are illustrated only for exemplifying the layer configuration, the thickness or the proportion of the thickness of each layer does not limit the present invention, and one or more layers (not illustrated) may be included in the wavelength conversion member. In the wavelength conversion member, it is preferable that light scattering layer is disposed on the exiting side from at least the wavelength conversion layer, from the viewpoint of further improving the brightness.

The thickness of the light scattering layer can be set to an arbitrary thickness, and can be 1 to 20 μm as an example. The thickness of the light scattering layer is preferably in a range of 1 to 10 μm, and is more preferably in a range of 1 to 5 μm, from the viewpoint of making the light scattering properties and thinning of the light scattering layer compatible.

It is desirable that the light scattering layer has a high haze, and the haze is preferably greater than or equal to 50%, is more preferably greater than or equal to 70%, and is even more preferably greater than or equal to 80%, from the viewpoint of improving in-plane homogeneity of light emitted from the backlight unit.

In addition, the light scattering layer may be included in the wavelength conversion member as a layer adjacent to the barrier film of which the details will be described below. In this case, it is preferable that a haze of a laminate of the light scattering layer and the barrier film is also in the range described above++.

The hazes of the light scattering layer and the laminate of the light scattering layer and the barrier film are values measured on the basis of JIS K 7136. Examples of a measurement device can include a hazemeter NDH2000 manufactured by Nippon Denshoku Industries Co., Ltd.

Total light ray transmittance of the light scattering layer is preferably greater than or equal to 50%, and is more preferably greater than or equal to 70%, from the viewpoint of improving the in-plane inhomogeneity of the light emitted from the backlight unit and from the viewpoint of improving the brightness. The total light ray transmittance of the light scattering layer is a value measured on the basis of JIS K 7136. Examples of a measurement device can include a hazemeter NDH2000 manufactured by Nippon Denshoku Industries Co., Ltd.

For example, the polymerizable composition described above is applied onto a suitable base material, and as necessary, a solvent is removed by drying the polymerizable composition, and after that, the polymerizable composition is polymerized and cured by light irradiation, heating, or the like, and thus, the light scattering layer can be formed. For example, a base material on which the wavelength conversion layer is formed in advance or a base material on which the wavelength conversion layer is formed after the light scattering layer is formed can be used as the base material. Thus, the wavelength conversion member including the wavelength conversion layer and the light scattering layer can be obtained through the base material or on the base material. Examples of a coating method include various known coating methods described below relevant to formation of a wavelength conversion layer. In addition, curing conditions can be suitably set according to the type of polymerizable compound to be used and the composition of the polymerizable composition.

<Wavelength Conversion Layer>
(Fluorescent Material)

The wavelength conversion layer contains at least a fluorescent material. The shape of the wavelength conversion layer is not particularly limited, and can have an arbitrary shape such as a sheet and a bar.

A known fluorescent material includes a fluorescent material (A) having a light emission center wavelength in a wavelength range of 600 nm to 680 nm, a fluorescent material (B) having a light emission center wavelength in a wavelength range of 520 nm to 560 nm, and a fluorescent material (C) having a light emission center wavelength in a wavelength range of 400 nm to 500 nm. The fluorescent material (A) is excited by exciting light and emits red light, the fluorescent material (B) emits green light, and the fluorescent material (C) emits blue light. For example, in a case where blue light is incident on the wavelength conversion layer containing the fluorescent material (A) and the fluorescent material (B) as the exciting light, as illustrated in FIGS. 1A and 1B, white light can be realized by the red light emitted from the fluorescent material (A), the green light emitted from the fluorescent material (B), and the blue light transmitted through the wavelength conversion layer. Alternatively, ultraviolet light is incident on the wavelength conversion layer containing the fluorescent materials (A), (B), and (C) as the exciting light, and thus, white light can be realized by the red light emitted from the fluorescent material (A), the green light emitted from the fluorescent material (B), and the blue light emitted from the fluorescent material (C).

An aspect of the fluorescent material is a quantum dot. In particular, in a case where the fluorescent material contained in the wavelength conversion layer is a quantum dot, it is preferable that the backlight unit is designed such that more light passes through the wavelength conversion layer, in order to obtain white light from the backlight unit in a small content of the fluorescent material (the quantum dot) and in order to perform wavelength conversion of a sufficient amount of light by the wavelength conversion layer. According to this, the amount of light passing through the light scattering layer increases, and thus, there is a tendency that the brightness is more considerably improved due to a reduction in a loss (light absorption) in the light scattering layer.

The quantum dot can be a quantum dot (QD) which is a fluorescent material can have a discrete energy level by a quantum confinement effect. The quantum dot is a preferred fluorescent material from the viewpoint that a half-width of fluorescent light emitted from the quantum dot is smaller than that of fluorescent light emitted from other fluorescent materials, and thus, white light obtained by using the light emitted from the quantum dot has excellent color reproducibility. The half-width of the fluorescent light emitted from the quantum dot is preferably less than or equal to 100 nm, is more preferably less than or equal to 80 nm, is even more preferably less than or equal to 50 nm, is still more preferably less than or equal to 45 nm, and is further more preferably less than or equal to 40 nm.

The quantum dot, for example, can be referred to paragraphs 0060 to 0066 of JP2012-169271A, in addition to the above description, but is not limited thereto. A commercially available product can be used as the quantum dot without any limitation. A light emission wavelength of the quantum dot, in general, can be adjusted according to the composition of the particles, the size of the particles, and the composition and the size of the particles.

Examples of the fluorescent material can include a ceramic fluorescent material. Examples of the ceramic fluorescent material include inorganic crystals such as yttrium.aluminum.garnet (YAG), and a ceramic fluorescent material in which a metal element is added to a metal oxide or a metal sulfide as an activator agent. Specific examples of the ceramic fluorescent material can include ceramic fluorescent materials described below. Hereinafter, metal species represented after ":" as a cation are metal elements added as the activator agent. A yttrium.aluminum.garnet (YAG:$Ce^{3+}$)-based fluorescent material (a YAG-based fluorescent material) activated by cerium, $(Ca,Sr,Ba)_2SiO_4$:$Eu^{2+}$, $SrGa_2S_4$:$Eu^{2+}$, α-SiAlON:$Eu^{2+}$, $Ca_3Sc_2Si_3O_{12}$:$Ce^{3+}$, $SrGa_2S_4$:$Eu^{2+}$, $(Ca,Sr,Ba)S$:$Eu^{2+}$, $(Ca,Sr,Ba)_2Si_5N_8$:$Eu^{2+}$, $CaAlSiN_3$:$Eu^{2+}$, and the like are included. In addition, for example, in the YAG-based fluorescent material, a part or all of yttrium (Y) may be substituted with at least one element selected from the group consisting of Lu, Sc, La, Gd, and Sm, and a part or all of aluminum (Al) may be substituted with at least one of Ga or In or both of Ga and In. Further, it is possible to adjust the light emission wavelength of the fluorescent material by changing the composition of the YAG-based fluorescent material. For example, a part or all of Y of the YAG-based fluorescent material is substituted with Gd, and thus, it is possible to shift the light emission wavelength to a long wavelength side. In addition, a substitution amount of Gd increases, and thus, the light emission wavelength is shifted to the long wavelength side. In addition, for example, a part of Al of the YAG-based fluorescent material is substituted with Ga, and thus, it is possible to shift the light emission wavelength to a short wavelength side. That is, in this case, a fluorescent material which emits light of a yellow color with a deep blue color (a green color) can be obtained. In other ceramic fluorescent materials, a light emission wavelength can be adjusted by composition adjustment.

The fluorescent material such as the quantum dot and the ceramic fluorescent material may be added to a polymerizable composition for forming a wavelength conversion layer (a fluorescent material-containing polymerizable composition) in a state of particles, or may be added in a state of a dispersion liquid in which the fluorescent materials are dispersed in a solvent. It is preferable that the fluorescent material is added in the state of the dispersion liquid from the viewpoint of suppressing aggregation of the particles of the fluorescent material. Here, the solvent to be used is not particularly limited. The fluorescent material can be added, for example, in the amount of approximately 0.01 to 10 parts by mass with respect to 100 parts by mass of the total amount of the polymerizable composition.

(Preparation Method of Wavelength Conversion Layer)

The fluorescent material described above, in general, is contained in the matrix of the wavelength conversion layer. The matrix, in general, is a polymer (an organic matrix) in which a polymerizable composition is polymerized by light irradiation, thermal curing, and the like. The shape of the wavelength conversion member is not particularly limited. For example, the wavelength conversion layer may be included in the backlight unit as it is, or may be included in the backlight unit described above as a laminate (the wavelength conversion member) of one or more other layers such as the barrier film described below. Specifically, the polymerizable composition (the curable composition) containing the fluorescent material is applied onto a suitable base material, and then, is subjected to a curing treatment by light irradiation or the like, and thus, the wavelength conversion layer can be obtained.

The polymerizable compound used for preparing the polymerizable composition is not particularly limited. Only one type of polymerizable compound may be used, or two or more types thereof may be used by being mixed. It is preferable that the content of the total polymerizable compound in the total amount of the polymerizable composition is approximately 10 to 99.99 mass %. Examples of a preferred polymerizable compound can include a monofunctional or polyfunctional (meth)acrylate-based compound of a monofunctional or polyfunctional (meth)acrylate monomer, a polymer and a prepolymer thereof, and the like, from the viewpoint of transparency, adhesiveness, and the like of a cured film after being cured.

Examples of the monofunctional (meth)acrylate monomer can include an acrylic acid and a methacrylic acid, a derivative thereof, and more specifically, a monomer having one polymerizable unsaturated bond of a (meth)acrylic acid (one (meth)acryloyl group) in molecules. Specific example thereof can be referred to paragraph 0022 of WO2012/077807A1.

A polyfunctional (meth)acrylate monomer having two or more (meth)acryloyl groups in molecules can be used together with the monomer having one polymerizable unsaturated bond of the (meth)acrylic acid described above (one (meth)acryloyl group) in one molecule. The details thereof can be referred to paragraph 0024 of WO2012/077807A1. In addition, a polyfunctional (meth)acrylate-based compound described in paragraphs 0023 to 0036 of JP2013-043382A can be used as the polyfunctional (meth)acrylate-based compound. Further, alkyl chain-containing (meth)acrylate monomers represented by General Formulas (4) to (6) described in paragraphs 0014 to 0017 of the specification of JP5129458B can also be used.

A use amount of the polyfunctional (meth)acrylate monomer is preferably greater than or equal to 5 parts by mass from the viewpoint of a hardness of a coated film, and is preferably less than or equal to 95 parts by mass from the viewpoint of suppressing gelation of the composition, with respect to 100 parts by mass of the total amount of the polymerizable compound contained in the polymerizable composition. In addition, from the same viewpoint, a use amount of the monofunctional (meth)acrylate monomer is preferably from 5 parts by mass to 95 parts by mass, with respect to 100 parts by mass of the total amount of the polymerizable compound contained in the polymerizable composition.

Examples of a preferred polymerizable compound can also include a compound having a cyclic group such as a cyclic ether group which can be subjected to ring-opening polymerization, such as an epoxy group and an oxetanyl group. More preferred examples of such a compound can include a compound having an epoxy group (an epoxy compound). The epoxy compound can be referred to paragraphs 0029 to 0033 of JP2011-159924A.

The polymerizable composition described above can contain a known radical polymerization initiator or a cationic polymerization initiator as a polymerization initiator. The polymerization initiator, for example, can be referred to paragraph 0037 of JP2013-043382A and paragraphs 0040 to 0042 of JP2011-159924A. The content of the polymerization initiator is preferably greater than or equal to 0.1 mol %, and is more preferably 0.5 to 5 mol %, with respect to the total amount of the polymerizable compound contained in the polymerizable composition.

A formation method of the wavelength conversion layer is not particularly limited insofar as the wavelength conversion layer is a layer containing the components described above and a known additive which can be arbitrarily added. A composition prepared by simultaneously or sequentially mixing the components described above and one or more types of known additives which are added as necessary is applied onto a suitable base material, and then, is subjected to a polymerization treatment by light irradiation, heating, or the like, and is polymerized and cured, and thus, the wavelength conversion layer containing the fluorescent material in the matrix can be formed. A use amount of the additive is not particularly limited, and can be suitably set. In addition, in order for a viscosity or the like of the composition, a solvent may be added, as necessary. In this case, the type and an added amount of the solvent to be used are not particularly limited. For example, one type or two or more types of organic solvents can be used by being mixed as the solvent.

The polymerizable composition described above is applied onto a suitable base material, and as necessary, a solvent is removed by drying the polymerizable composition, and after that, the polymerizable composition is polymerized and cured by light irradiation or the like, and thus, the wavelength conversion layer can be obtained. Examples of a coating method include a known coating method such as a curtain coating method, a dip coating method, a spin coating method, a printing coating method, a spray coating method, a slot coating method, a roll coating method, a slide coating method, a blade coating method, a gravure coating method, and a wire bar method. In addition, curing conditions can be suitably set according to the type of the polymerizable compound to be used or the composition of the polymerizable composition.

The polymerization treatment of the polymerizable composition described above may be performed by any method, and can be performed in a state where the polymerizable composition is sandwiched between two base materials, as an aspect. An aspect of a manufacturing step of the wavelength conversion member, in which such a polymerization treatment is included, will be described with reference to the drawings. Here, the present invention is not limited to the aspect described below.

Figure 3:
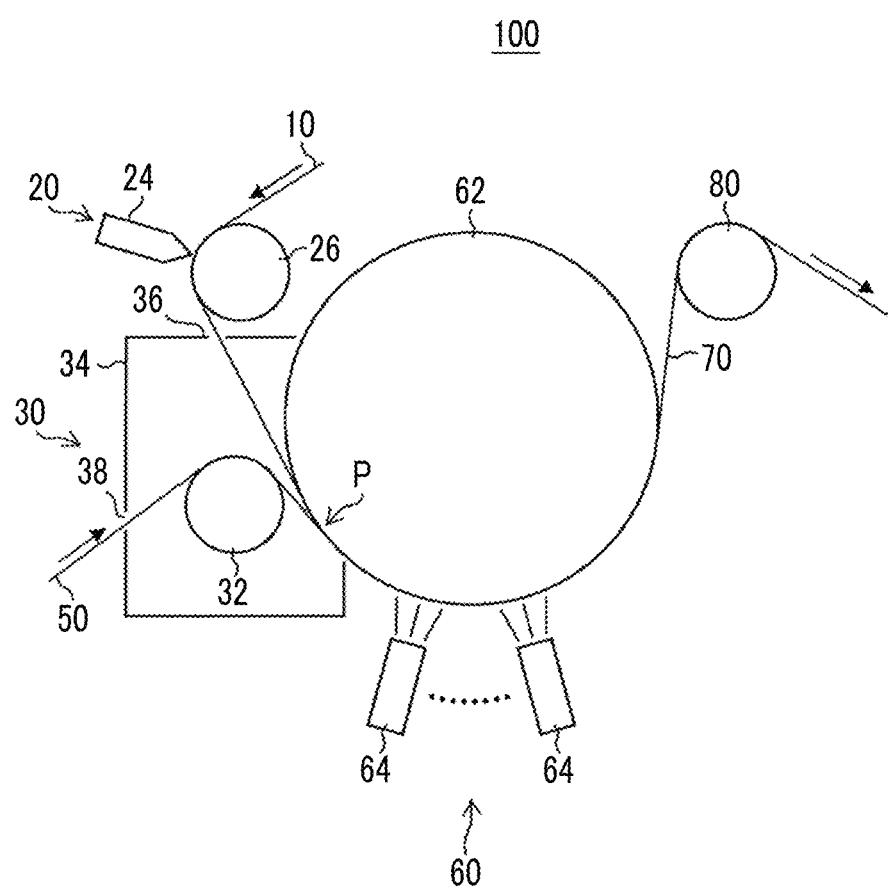
FIG. 3 is a schematic configuration diagram of an example of a manufacturing device of the wavelength conversion member.
Figure 4:
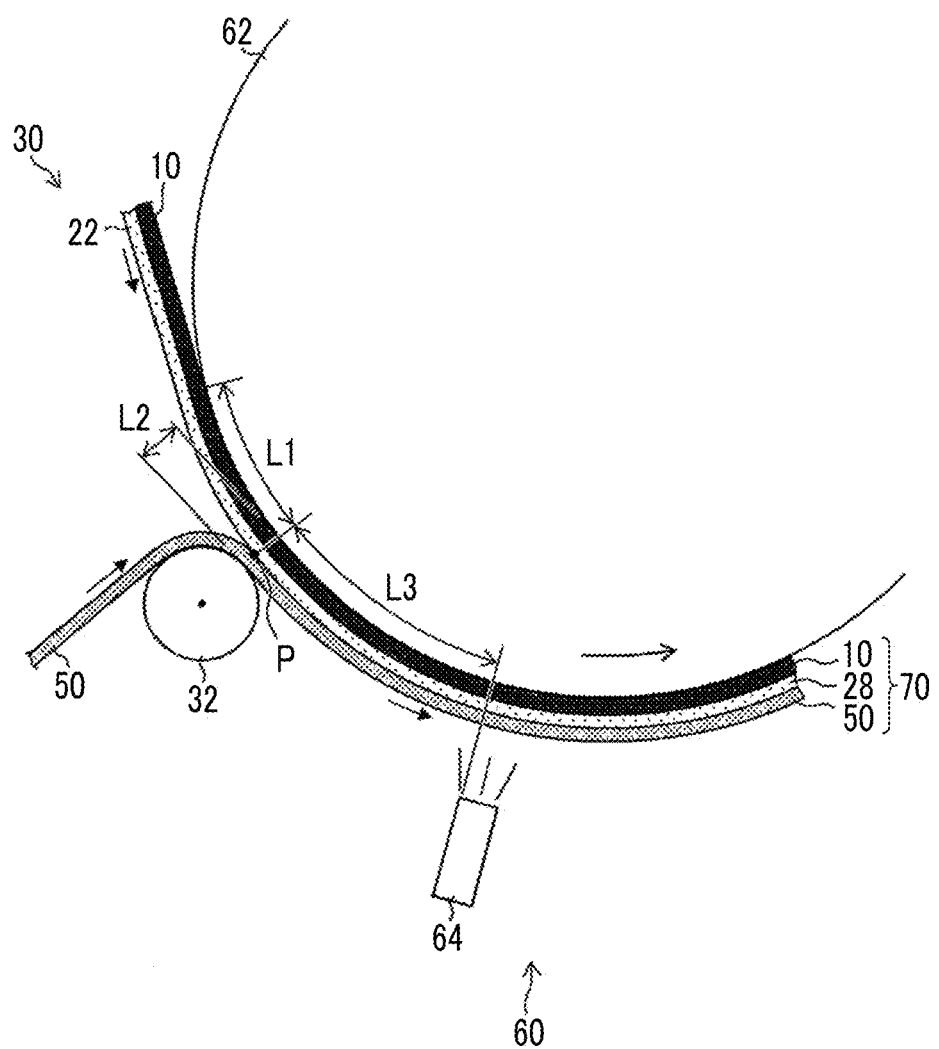
FIG. 4 is a partially enlarged view of the manufacturing device illustrated in FIG. 3.

FIG. 3 is a schematic configuration diagram of an example of a manufacturing device 100 of the wavelength conversion member, and FIG. 4 is a partially enlarged view of the manufacturing device illustrated in FIG. 3. The manufacturing step of the wavelength conversion member using the manufacturing device 100 illustrated in FIGS. 3 and 4, includes at least:

a step of applying the polymerizable composition containing the fluorescent material onto a surface of a first base material (hereinafter, also referred to as a "first film") which is continuously handled, and of forming a coated film;

a step of laminating (superimposing) a second base material (hereinafter, also referred to as a "second film") which is continuously handled, on the coated film, and of sandwiching the coated film between the first film and the second film; and a step of winding any one of the first film and the second film around a backup roller in a state where the coated film is sandwiched between the first film and the second film, of polymerizing and curing the coated film by light irradiation while continuously handling the film, and of forming the wavelength conversion layer (a cured layer). A barrier film having barrier properties with respect to oxygen or moisture is used as any one of the first base material and the second base material, and thus, it is possible to obtain a wavelength conversion member of which one surface is protected with the barrier film. In addition, a barrier film is used as each of the first base material and the second base material, and thus, it is possible to obtain a wavelength conversion member in which both surfaces of the wavelength conversion layer are protected with the barrier film. In addition, a barrier film on which a light scattering layer is laminated is used, and thus, it is possible to obtain a wavelength conversion member including the wavelength conversion layer, the barrier film, and the light scattering layer. It is preferable that the light scattering layer is disposed on one surface of the barrier film, and the wavelength conversion layer is disposed on the other surface, from the viewpoint of protecting the wavelength conversion layer with the barrier film. Alternatively, a polymerizable composition for forming a light scattering layer is applied onto the barrier film after the wavelength conversion layer is laminated thereon, and is subjected to a polymerization treatment, and thus, the light scattering layer may be formed.

More specifically, first, a first film 10 is continuously handled to a coating unit 20 from a feeding machine (not illustrated). For example, the first film 10 is fed at a handling speed of 1 to 50 m/minute from the feeding machine. Here, the handling speed is not limited thereto. For example, a tensile force of 20 to 150 N/m, preferably a tensile force of 30 to 100 N/m is applied to the first film 10 at the time of being fed.

In the coating unit 20, the polymerizable composition containing the fluorescent material (hereinafter, also referred to as a "coating liquid") is applied onto the surface of the first film 10 which is continuously handled, and thus, a coated film 22 (refer to FIG. 4) is formed. The coating unit 20, for example, includes a die coater 24, and a backup roller 26 disposed to face the die coater 24. A surface of the first film 10 on a side opposite to the surface on which the coated film 22 is formed is wound around a backup roller 26, and the coating liquid is applied onto the surface of the first film 10 which is continuously handled from an ejection port of the die coater 24, and thus, the coated film 22 is formed. Here, the coated film 22 indicates the coating liquid applied onto the first film 10 before being subjected to a polymerization treatment.

In this embodiment, the die coater 24 to which an extrusion coating method is applied is described as a coating device, but the coating device is not limited thereto. For example, a coating device to which various methods such as a curtain coating method, an extrusion coating method, a rod coating method, or a roll coating method are applied can be used.

The first film 10 on which the coated film 22 is formed is continuously handled to a laminating unit 30 through the coating unit 20. In the laminating unit 30, a second film 50 which is continuously handled is laminated on the coated film 22, and thus, the coated film 22 is sandwiched between the first film 10 and the second film 50.

The laminating unit 30 includes a laminating roller 32, and a heating chamber 34 surrounding the laminating roller 32. The heating chamber 34 includes an opening portion 36 for allowing the first film 10 to pass therethrough, and an opening portion 38 for allowing the second film 50 to pass therethrough.

A backup roller 62 is disposed in a position facing the laminating roller 32. In the first film 10 on which the coated film 22 is formed, the surface on a side opposite to the surface on which the coated film 22 is formed is wound around the backup roller 62, and is continuously handled to a lamination position P. The lamination position P indicates a position in which the second film 50 starts to be in contact with the coated film 22. It is preferable that the first film 10 is wound around the backup roller 62 before reaching the lamination position P. This is because even in a case where wrinkles are generated on the first film 10, the wrinkles can be reformed and removed by the backup roller 62 until the first film 10 reaches the lamination position P. Therefore, it is preferable that a distance L1 between the position (a contact position) where the first film 10 is wound around the backup roller 62 and the lamination position P is long, and for example, the distance L1 is preferably greater than or equal to 30 mm, and the upper limit value, in general, is determined according to the diameter and a pass line of the backup roller 62.

In this embodiment, the second film 50 is laminated by the backup roller 62 which is used in a polymerization treatment unit 60 and the laminating roller 32. That is, the backup roller 62 which is used in the polymerization treatment unit 60 is also used as a roller which is used in the laminating unit 30. Here, the configuration is not limited to the embodiment described above, but a roller for lamination is disposed in the laminating unit 30, separately from the backup roller 62, such that the backup roller 62 is not also used as the roller which is used in the laminating unit 30.

By using the backup roller 62 which is used in the polymerization treatment unit 60 in the laminating unit 30, it is possible to decrease the number of rollers. In addition, the backup roller 62 can also be used as a heat roller with respect to the first film 10.

The second film 50 fed from the feeding machine (not illustrated) is wound around the laminating roller 32, and is continuously handled between the laminating roller 32 and the backup roller 62. In the lamination position P, the second film 50 is laminated on the coated film 22 which is formed on the first film 10. Accordingly, the coated film 22 is sandwiched between the first film 10 and the second film 50. The lamination indicates that the second film 50 is laminated on the coated film 22 by being superimposed.

It is preferable that a distance L2 between the laminating roller 32 and the backup roller 62 is greater than or equal to the value of the total thickness of the first film 10, a wavelength conversion layer (a cured layer) 28 formed by polymerizing and curing the coated film 22, and the second film 50. In addition, it is preferable that L2 is less than or equal to a length obtained by adding 5 min to the total thickness of the first film 10, the coated film 22, and the second film 50. By setting the distance L2 to be less than or equal to the length obtained by adding 5 mm to the total thickness, it is possible to prevent bubbles from entering between the second film 50 and the coated film 22. Here, the distance L2 between the laminating roller 32 and the backup roller 62 indicates the shortest distance between an outer circumferential surface of the laminating roller 32 and an outer circumferential surface of the backup roller 62.

A rotation accuracy of the laminating roller 32 and the backup roller 62 is less than or equal to 0.05 mm, and is preferably less than or equal to 0.01 mm, in radial deflection. It is possible to decrease a thickness distribution of the coated film 22 as the radial deflection becomes small.

In addition, in order to suppress thermal deformation after sandwiching the coated film 22 between the first film 10 and the second film 50, a difference between the temperature of the backup roller 62 in the polymerization treatment unit 60 and the temperature of the first film 10, and a difference between the temperature of the backup roller 62 and the temperature of the second film 50 are preferably lower than or equal to 30° C., and are more preferably lower than or equal to 15° C., and it is most preferable that the temperatures are identical to each other.

In a case where a heating chamber 34 is disposed in order to decrease the difference with respect to the temperature of the backup roller 62, it is preferable that the first film 10 and the second film 50 are heated in the heating chamber 34. For example, in the heating chamber 34, hot air is supplied by a hot air generating device (not illustrated), and thus, it is possible to heat the first film 10 and the second film 50.

The first film 10 is wound around the backup roller 62 of which the temperature is adjusted, and thus, the first film 10 may be heated by the backup roller 62.

On the other hand, in the second film 50, the laminating roller 32 is set to a heat roller, and thus, it is possible to heat the second film 50 by the laminating roller 32.

Here, the heating chamber 34 and the heat roller are not essential constituents, and can be disposed as necessary.

Next, the coated film 22 is continuously handled to the polymerization treatment unit 60 in a state of being sandwiched between the first film 10 and the second film 50. In the aspect illustrated in the drawing, the polymerization treatment in the polymerization treatment unit 60 is performed by light irradiation, and in a case where the polymerizable compound contained in the coating liquid is polymerized by heating, the polymerization treatment can be performed by heating such as blowing off warm air.

A light irradiation device 64 is disposed in a position facing the backup roller 62. The first film 10 and the second film 50 sandwiching the coated film 22 therebetween are continuously handled between the backup roller 62 and the light irradiation device 64. Light emitted from the light irradiation device may be determined according to the type of photopolymerizable compound contained in the coating liquid, and examples of the light include an ultraviolet ray. For example, a low pressure mercury lamp, a medium pressure mercury lamp, a high pressure mercury lamp, a super high pressure mercury lamp, a carbon arc lamp, a metal halide lamp, a xenon lamp, and the like can be used as a light source emitting an ultraviolet ray. Light irradiation dose may be set in a range where the coated film can be polymerized and cured, and for example, the coated film 22 can be irradiated with an ultraviolet ray having irradiation dose of 100 to 10,000 $mJ/cm^2$, as an example.

In the polymerization treatment unit 60, the first film 10 is wound around the backup roller 62 in a state where the coated film 22 is sandwiched between the first film 10 and the second film 50, the coated film 22 is irradiated with the light from the light irradiation device 64 while being continuously handled, and the coated film 22 is cured, and thus, it is possible to form the wavelength conversion layer (the cured layer) 28.

In this embodiment, the first film 10 side is wound around the backup roller 62 and is continuously handled, but the second film 50 can be wound around the backup roller 62 and can be continuously handled.

Being wound around the backup roller 62 indicates a state where any one of the first film 10 and the second film 50 is in contact with the surface of the backup roller 62 at a certain warp angle. Therefore, the first film 10 and the second film 50 are moved in synchronization with the rotation of the backup roller 62 while being continuously handled. Being wound around the backup roller 62 may be performed while being irradiated with at least an ultraviolet ray.

The backup roller 62 includes a cylindrical main body, and a rotation axis disposed on both end portions of the main body. The main body of the backup roller 62, for example, has a diameter of φ200 to 1,000 mm. The diameter φ of the backup roller 62 is not limited. In consideration of curling deformation, facility costs, and a rotation accuracy, it is preferable that the diameter is φ300 to 500 mm. By attaching a temperature adjuster to the main body of the backup roller 62, it is possible to adjust the temperature of the backup roller 62.

The temperature of the backup roller 62 can be determined in consideration of heat generated at the time of performing light irradiation, a curing efficiency of the coated film 22, and the occurrence of wrinkle deformation of the first film 10 and the second film 50 on the backup roller 62. The backup roller 62, for example, is preferably set to be in a temperature range of 10° C. to 95° C., and is more preferably set to be in a temperature range of 15° C. to 85° C. Here, the temperature relevant to the roller indicates a surface temperature of the roller.

It is possible to set a distance L3 between the lamination position P and the light irradiation device 64, for example, to be greater than or equal to 30 mm.

The coated film 22 becomes the cured layer 28 by light irradiation, and thus, a wavelength conversion member 70 including the first film 10, the cured layer 28, and the second film 50 is manufactured. The wavelength conversion member 70 is peeled off from the backup roller 62 by a peeling off roller 80. The wavelength conversion member 70 is continuously handled to a winder (not illustrated), and then, the wavelength conversion member 70 is wound in the shape of a roll by the winder.

As described above, the aspect of the manufacturing step of the wavelength conversion member has been described, but the present invention is not limited to the aspect described above. For example, the polymerizable composition containing the fluorescent material is applied onto a base material, and is subjected to the polymerization treatment after a drying treatment which is performed as necessary, without laminating another base material on the base material coated with the polymerizable composition containing the fluorescent material, and thus, the wavelength conversion layer (the cured layer) may be prepared. One or more other layers can be laminated on the prepared wavelength conversion layer by a known method.

The thickness of the wavelength conversion layer is preferably in a range of 1 to 500 μm, is more preferably in a range of 10 to 250 μm, and is even more preferably in a range of 30 to 150 μm. In a case where the thickness is greater than or equal to 1 μm, it is preferable since a high wavelength conversion effect can be obtained. In addition, in a case where the thickness is less than or equal to 500 μm, it is preferable since in a case where the wavelength conversion layer is incorporated in a backlight unit, it is possible to thin the backlight unit.

<Support>

The wavelength conversion member may include a support for improvement in the hardness, ease of film formation, and the like. The support may be a layer adjacent to the wavelength conversion layer, or may be included as a base material film of the barrier film described below. In the wavelength conversion member, the support may be included such that an inorganic layer described below and the support are arranged in this order, or may be included such that the wavelength conversion layer, the inorganic layer described below, an organic layer described below, and the support are arranged in this order. The support may be disposed between the organic layer and the inorganic layer, between two organic layers, or between two inorganic layers. In addition, one or two or more supports may be included in the wavelength conversion member, and the wavelength conversion member may have a structure in which the support, the wavelength conversion layer, and the support are laminated in this order. A transparent support which is transparent with respect to visible light is preferable as the support. Here, being transparent with respect to the visible light indicates that a light ray transmittance in a visible light range is greater than or equal to 80%, and is preferably greater than or equal to 85%. The light ray transmittance which is used as a scale of transparency can be calculated by a method described in JIS-K7105, that is, by measuring the total light ray transmittance and the amount of scattering light with an integrating sphere type light ray transmittance measurement device, and by subtracting a diffusion transmittance from the total light ray transmittance. The support can referred to paragraphs 0046 to 0052 of JP2007-290369A and paragraphs 0010 to 0055 of JP2005-096108A. The thickness of the support is in a range of 10 μm to 500 μm from the viewpoint of gas barrier properties, impact resistance, and the like, and among them, a range of 15 to 400 μm is preferable, and a range of 20 to 300 μm is particularly preferable.

The support can be used as a base material of the barrier film described below. In addition, the support can be used as any one or both of the first film and the second film described above. When the support is used in both of the first film and the second film, the supports to be used may be identical to each other or different from each other.

<Barrier Film>

It is preferable that the wavelength conversion member includes the barrier film. The barrier film is a film having a gas barrier function of blocking oxygen. It is preferable that the barrier film has a function of blocking water vapor.

It is preferable that barrier film is included in the wavelength conversion member as a layer which is directly in contact with the wavelength conversion layer. In addition, one or two or more barrier films may be included in the wavelength conversion member. It is preferable that the wavelength conversion member has a structure in which the barrier film, the wavelength conversion layer, and the barrier film are laminated in this order.

In the wavelength conversion member, the wavelength conversion layer may be formed by using the barrier film as a base material. In addition, the barrier film can be used as any one or both of the first film and the second film described above. When both of the first film and the second film are the barrier films, the barrier films which are used as the first film and the second film may be identical to each other or different from each other.

The barrier film may be any known barrier film, and for example, may be the barrier film described below.

In general, the barrier film may include at least an inorganic layer, or may be a film including a base material film and an inorganic layer. The base material film can be referred to the description of the support described above. The barrier film may include a barrier laminate including at least one inorganic layer described above and at least one organic layer on the base material film. It is preferable that a plurality of layers are laminated as described above since it is possible to further increase barrier properties. On the other hand, the light transmittance of the wavelength conversion member tends to decrease as the number of layers to be laminated increases, and thus, it is desirable that the number of layers to be laminated increases in a range where an excellent light transmittance can be maintained. Specifically, it is preferable that the total light ray transmittance of the barrier film in a visible light range is greater than or equal to 80%, and it is preferable that an oxygen permeability of the barrier film is less than or equal to 1.00 $cm^3$/($m^2 \cdot day \cdot atm$). Here, the oxygen permeability described above is a value measured by using an oxygen gas permeability measurement device (manufactured by manufactured by MOCON, Inc., OX-TRAN 2/20: Product Name) under conditions of a measurement temperature of 23° C. and relative humidity of 90%. In addition, the visible light range indicates a wavelength range of 380 to 780 nm, and the total light ray transmittance indicates the average value of the light transmittance in the visible light range.

The oxygen permeability of the barrier film is more preferably less than or equal to 0.10 cm³/(m²·day·atm), and is even move preferably less than or equal to 0.01 cm³/(m²·day·atm). The total light ray transmittance in the visible light range is more preferably greater than or equal to 90%. It is preferable that the oxygen permeability becomes lower, and it is preferable that the total light ray transmittance in the visible light range becomes higher.

(Inorganic Layer)

The "inorganic layer" is a layer containing an inorganic material as a main component, and is preferably a layer formed only of an inorganic material. In contrast, the organic layer is a layer containing an organic material as a main component, and indicates a layer containing an organic material of preferably greater than or equal to 50 mass %, more preferably greater than or equal to 80 mass %, and particularly preferably greater than or equal to 90 mass %.

The inorganic material configuring the inorganic layer is not particularly limited, and for example, various inorganic compounds such as a metal, an inorganic oxide, a nitride, and an oxynitride can be used. Silicon, aluminum, magnesium, titanium, tin, indium, and cerium are preferable as an element configuring the inorganic material, and one type or two or more types thereof may be contained. Specific examples of the inorganic compound can include silicon oxide, silicon carbide, silicon oxynitride, magnesium oxide, titanium oxide, tin oxide, an indium oxide alloy, aluminum oxide, silicon nitride, aluminum nitride, and titanium nitride. In addition, a metal film, for example, an aluminum film, a silver film, a tin film, a chromium film, a nickel film, and a titanium film may be disposed as the inorganic layer.

In the materials described above, silicon oxide, silicon nitride, silicon carbide, and aluminum oxide are particularly preferable. This is because an inorganic layer formed of such materials has excellent adhesiveness with respect to an organic layer, and thus, it is possible to further increase the barrier properties.

A formation method of the inorganic layer is not particularly limited, and for example, various film formation methods can be used in which a film formation material can be deposited on a surface to be subjected to vapor deposition by being evaporated or scattered.

Examples of the formation method of the inorganic layer include a physical vapor deposition method such as a vacuum vapor deposition method in which vapor deposition is performed by heating an inorganic material such as inorganic oxide, an inorganic nitride, an inorganic oxynitride, and a metal; an oxidation reaction vapor deposition method in which vapor deposition is performed by using an inorganic material as a raw material, by introducing oxygen gas, and by performing oxidation; a sputtering method in which vapor deposition is performed by using an inorganic material as a target raw material, by introducing argon gas and oxygen gas, and by performing sputtering; and an ion plating method in which vapor deposition is performed by heating an inorganic material with a plasma beam generated from a plasma gun, a plasma chemical vapor deposition method in which an organic silicon compound is used as a raw material in a case where a vapor-deposited film of silicon oxide is formed, and the like. The vapor deposition may be performed with respect to the surface of the support, the base material film, the wavelength conversion layer, and the organic layer, and the like by using the support, the base material film, the wavelength conversion layer, and the organic layer, and the like as a substrate.

The thickness of the inorganic layer may be 1 nm to 500 nm, is preferably 5 nm to 300 nm, and is particularly preferably 10 nm to 150 nm. This is because it is possible to suppress reflection on the inorganic layer while realizing excellent barrier properties, and it is possible to provide a wavelength conversion member having a higher light transmittance by setting a film thickness of the adjacent inorganic layer to be in the range described above.

In the wavelength conversion member, it is preferable that at least one main surface of the wavelength conversion layer is directly in contact with the inorganic layer. It is also preferable that the inorganic layer is directly in contact with both main surfaces of the wavelength conversion layer. Here, the "main surface" indicates a surface (a front surface or a back surface) of the wavelength conversion layer disposed on a visible side or a backlight side at the time of using the wavelength conversion member. The same applies to main surfaces of other layers or other members. In addition, the inorganic layer and the organic layer, two inorganic layers, or two organic layers may be bonded to each other by a known adhesive layer. It is preferable that the adhesive layer is small, and it is more preferable that the adhesive layer does not exist, from the viewpoint of improving the light transmittance. In an aspect, it is preferable that the inorganic layer is directly in contact with the organic layer.

(Organic Layer)

The organic layer can be referred to paragraphs 0020 to 0042 of JP2007-290369A and paragraphs 0074 to 0105 of JP2005-096108A. Furthermore, it is preferable that the organic layer contains a CARDO polymer. Accordingly, adhesiveness between the organic layer and the adjacent layer, in particular, adhesiveness between the organic layer and the inorganic layer becomes excellent, and thus, it is possible to realize more excellent gas barrier properties. The details of the CARDO polymer can be referred to paragraphs 0085 to 0095 of JP2005-096108A described above. A film thickness of the organic layer is preferably in a range of 0.05 μm to 10 μm, and among them, a range of 0.5 to 10 μm is preferable. In a case where the organic layer is formed by a wet coating method, the film thickness of the organic layer is in a range of 0.5 to 10 μm, and among them, a range of 1 μm to 5 μm is preferable. In addition, in a case where the organic layer is formed by a dry coating method, the film thickness of the organic layer is in a range of 0.05 μm to 5 μm, and among them, a range of 0.05 μm to 1 μm is preferable. This is because it is possible to make the adhesiveness with respect to the inorganic layer more excellent by setting the film thickness of the organic layer which is formed by the wet coating method or the dry coating method to be in the range described above.

The other details of the inorganic layer and the organic layer can be referred to the descriptions of JP2007-290369A and JP2005-096108A described above, and US2012/0113672A1.

Regarding refractive indices of each of the layers and the base material film described above which can be included in the barrier film, for example, the refractive index of the inorganic layer is in a range of 1.60 to 1.82, the refractive index of the organic layer is in a range of 1.42 to 1.62, and the refractive index of the base material film is in a range of 1.45 to 1.65, but are not particularly limited. In addition, in the refractive indices, a magnitude relationship between the refractive index n1 of the wavelength conversion layer and the refractive index n2 of the light scattering layer does not matter. The refractive indices may be identical to n1 and n2, may be different from n1 and n2, or may be greater than n1 and n2. It is preferable that a refractive index difference with respect to the adjacent layer is small, and for example, the refractive index difference with respect to the adjacent layer is preferably less than 5.00, and is more preferably less than 3.00, from the viewpoint of suppressing reflection on an interface with respect to the adjacent layer. The same applies to a case where layers other than the barrier film are included.

[Backlight Unit]

The wavelength conversion member can be used as a constituent of a backlight unit. The backlight unit includes at least the wavelength conversion member and a light source.

(Light Emission Wavelength of Backlight Unit)

It is preferable that a backlight unit including a multi-wavelength light source is used as the backlight unit from the viewpoint of realizing a high brightness and a high color reproducibility. For example, it is preferable to emit blue light having a light emission center wavelength in a wavelength range of 430 to 480 nm and a light emission intensity peak of which the half-width is less than or equal to 100 nm, green light having a light emission center wavelength in a wavelength range of 520 to 560 nm and a light emission intensity peak of which the half-width is less than or equal to 100 nm, and red light having a light emission center wavelength in a wavelength range of 600 to 680 nm and a light emission intensity peak of which the half-width is less than or equal to 100 nm.

It is more preferable that a wavelength range of blue light emitted from the backlight unit is in a range of 440 to 475 nm from the viewpoint of further improving the brightness and the color reproducibility.

From the same viewpoint, it is more preferable that a wavelength range of green light emitted from the backlight unit is in a range of 520 to 545 nm.

In addition, from the same viewpoint, it is more preferable that a wavelength range of red light emitted from the backlight unit is in a range of 610 to 640 nm.

In addition, from the same viewpoint, all half-widths of light emission intensities of each of the blue light, the green light, and the red light emitted from the backlight unit are preferably less than or equal to 80 nm, are more preferably less than or equal to 50 nm, are even more preferably less than or equal to 40 nm, and are further even more preferably less than or equal to 30 nm. Among them, it is particularly preferable that the half-width of the light emission intensity of the blue light is less than or equal to 25 nm.

The backlight unit includes at least the light source along with the wavelength conversion member described above. In an aspect, a light source emitting blue light which has a light emission center wavelength in a wavelength range of 430 nm to 480 nm (a blue light source), for example, a blue light emitting diode emitting blue light can be used as the light source. In a case where the light source emitting blue light is used, it is preferable that at least the fluorescent material which is excited by exciting light and emits red light and the fluorescent material which emits green light are contained in the wavelength conversion layer. Accordingly, it is possible to realize white light by the blue light which is emitted from the light source and is transmitted through the wavelength conversion member, and the red light and the green light emitted from the wavelength conversion member.

In addition, in another aspect, a light source emitting ultraviolet light which has a light emission center wavelength in a wavelength range of 300 nm to 430 nm (an ultraviolet light source), for example, an ultraviolet ray light emitting diode can be used as the light source. In this case, it is preferable that the fluorescent material which is excited by exciting light and emits blue light is contained in the wavelength conversion layer, along with the fluorescent material emitting the red light and the fluorescent material emitting the green light. Accordingly, it is possible to realize white light by the red light, the green light, and the blue light which are emitted from the wavelength conversion member.

In addition, in another aspect, the light emitting diode can be substituted with a laser light source.

(Configuration of Backlight Unit)

For example, the backlight unit can be an edge light mode backlight unit including a light guide plate, a reflection plate, and the like as a constituent. In FIGS. 1A and 1B, an example of an edge light mode backlight unit is illustrated. A known light guide plate can be used as the light guide plate without any limitation. Here, the backlight unit may be a direct backlight mode backlight unit.

In addition, the backlight unit can include a reflection member in the rear portion of the light source. Such a reflection member is not particularly limited, and known reflection members described in JP3416302B, JP3363565B, JP4091978B, JP3448626B, and the like can be used, and the contents of the publications are incorporated in the present invention.

It is also preferable that the backlight unit further includes a known diffusion plate or a known diffusion sheet, a known prism sheet (for example, BEF series manufactured by Sumitomo manufactured by 3M Company Limited, and the like), and a known light guide device. Such other members are described in the publications of JP3416302B, JP3363565B, JP4091978B, JP3448626B, and the like, and the contents of the publications are incorporated in the present invention.

[Liquid Crystal Display Device]

The backlight unit described above can be applied to a liquid crystal display device. The liquid crystal display device may have a configuration including at least the backlight unit described above and a liquid crystal cell.

(Configuration of Liquid Crystal Display Device)

A driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode can be used. It is preferable that the liquid crystal cell in the VA mode, in the OCB mode, in the IPS mode, or in the TN mode, but the mode of the liquid crystal cell is not limited thereto. Examples of the configuration of the liquid crystal display device in the VA mode include a configuration illustrated in FIG. 3 of JP2008-262161A. Here, a specific configuration of the liquid crystal display device is not particularly limited, and a known configuration can be adopted.

In an embodiment of the liquid crystal display device, the liquid crystal display device includes a liquid crystal cell sandwiching a liquid crystal layer between two facing substrates of which at least one base material includes an electrode, and the liquid crystal cell is configured by being disposed between two polarizing plates. The liquid crystal display device includes the liquid crystal cell in which liquid crystals are sealed between the upper and lower substrates, and an alignment state of the liquid crystals is changed by applying a voltage, and thus, an image is displayed. Further, as necessary, the liquid crystal display device includes a subsidiary functional layer such as a polarizing plate protective film or an optical compensation member performing optical compensation, and an adhesive layer. In addition, a surface layer such as a forward scattering layer, a primer layer, an antistatic layer, and an undercoat layer may be disposed along with (or instead of) a color filter substrate, a thin layer transistor substrate, a lens film, a diffusion sheet, a hard coat layer, an antireflection layer, a low reflective layer, an antiglare layer, and the like.

Figure 5:
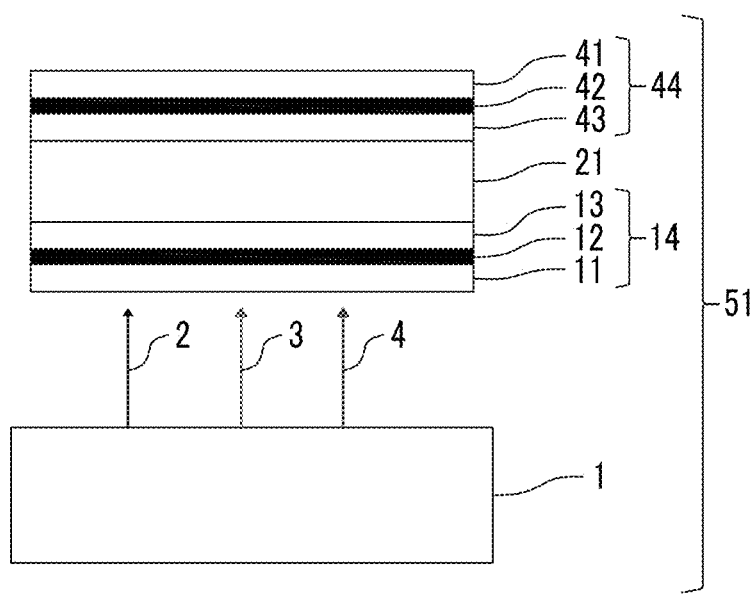
FIG. 5 illustrates an example of a liquid crystal display device.

FIG. 5 illustrates an example of a liquid crystal display device according to an aspect of the present invention. A liquid crystal display device 51 illustrated in FIG. 5 includes a backlight side polarizing plate 14 on a surface of a liquid crystal cell 21 on a backlight side. The backlight side polarizing plate 14 may or may not include a polarizing plate protective film 11 on a surface of a backlight side polarizer 12 on the backlight side, and it is preferable that the backlight side polarizing plate 14 includes the polarizing plate protective film 11.

It is preferable that the backlight side polarizing plate 14 has a configuration in which the polarizer 12 is sandwiched between two polarizing plate protective films 11 and 13.

In this specification, a polarizing plate protective film on a side close to the liquid crystal cell with respect to the polarizer will be referred to as an inner side polarizing plate protective film, and a polarizing plate protective film on a side separated from the liquid crystal cell with respect to the polarizer will be referred to as an outer side polarizing plate protective film. In the example illustrated in FIG. 5, the polarizing plate protective film 13 is the inner side polarizing plate protective film, and the polarizing plate protective film 11 is the outer side polarizing plate protective film.

The backlight side polarizing plate may include a phase difference film as the inner side polarizing plate protective film on the liquid crystal cell side. A known cellulose acylate film or the like can be used as the phase difference film.

The liquid crystal display device 51 includes a display side polarizing plate 44 on the surface of the liquid crystal cell 21 on a side opposite to the surface on the backlight side. The display side polarizing plate 44 has a configuration in which a polarizer 42 is sandwiched between two polarizing plate protective films 41 and 43. The polarizing plate protective film 43 is the inner side polarizing plate protective film, and the polarizing plate protective film 41 is the outer side polarizing plate protective film.

The backlight unit 1 included in the liquid crystal display device 51 is as described above.

The liquid crystal cell, the polarizing plate, the polarizing plate protective film, and the like which configure the liquid crystal display device are not particularly limited, and constituents prepared by a known method or commercially available products can be used without any limitation. In addition, it is obviously possible to dispose a known interlayer such as an adhesive layer between the respective layers.

EXAMPLES

Hereinafter, the present invention will be described in more detail on the basis of the following examples. Materials, use amounts, ratios, treatment contents, treatment sequences, and the like of the following examples can be suitably changed unless the changes cause deviance from the gist of the present invention. Therefore, the range of the present invention will not be restrictively interpreted by the following specific examples.

<Preparation of Wavelength Conversion Member>
(Preparation of Barrier Film 11)

A polyethylene terephthalate film (a PET film, Product Name: COSMOSHINE (Registered Trademark) A4300 manufactured by TOYOBO CO., LTD., a thickness of 50 µm) was used as a support, and an organic layer and an inorganic layer were sequentially formed on one surface side of the support in the following procedure.

Trimethylol propane triacrylate (TMPTA manufactured by DAICEL-ALLNEX LTD.) and a photopolymerization initiator (ESACURE KTO46 manufactured by Lamberti S.p.A.) were prepared, were weighed to have a mass ratio of 95:5, and were dissolved in methyl ethyl ketone, and thus, a coating liquid having a concentration of solid contents of 15% was obtained. The coating liquid was applied onto the PET film described above in a roll-to-roll manner by using a die coater, and passed through a drying zone at 50° C. for 3 minutes. After that, the coating liquid was irradiated with an ultraviolet ray (integrated irradiation dose of approximately 600 mJ/cm$^2$) under a nitrogen atmosphere, was cured by ultraviolet ray curing, and was wound. A thickness of a first organic layer formed on the support was 1 µm.

Next, the inorganic layer (a silicon nitride layer) was formed on the surface of the organic layer described above by using a roll-to-roll type chemical vapor deposition (CVD) device. Silane gas (a flow rate of 160 sccm), ammonia gas (a flow rate of 370 sccm), hydrogen gas (a flow rate of 590 sccm), and nitrogen gas (a flow rate of 240 sccm) were used as raw material gas. High frequency power having a frequency of 13.56 MHz was used as power. A film formation pressure was 40 Pa, and an arrival thickness was 50 nm.

Thus, a barrier film 11 was prepared in which the inorganic layer was laminated on the surface of the first organic layer which was formed on the support.

(Preparation of Barrier Film with Light Scattering Layer (Laminated Film 13))

The surface of the inorganic layer of the barrier film 11 was protected by bonding a protective film (PAC2-30-T manufactured by Sun A. Kaken Co., Ltd.) thereonto, and then, a light scattering layer was formed a back surface of the PET film surface by the following method.

—Preparation of Polymerizable Composition for Forming Light Scattering Layer—

150 g of silicone resin particles (TOSPEARL 120 manufactured by Momentive Performance Materials Inc., a particle size of 2.0 µm) and 40 g of polymethyl methacrylate (PMMA) particles (TECHPOLYMER manufactured by SEKISUI CHEMICAL Co., LTD., a particle size of 8 µm) were stirred as light scattering particles in 550 g of methyl isobutyl ketone (MIBK) first for approximately 1 hour, and were dispersed, and thus, a dispersion liquid was obtained.

50 g of an acrylate-based compound (Viscoat 700HV manufactured by Osaka Organic Chemical Industry, Ltd.) and 40 g of an acrylate-based compound (8BR500 manufactured by TAISEI FINE CHEMICAL CO., LTD. (urethane (meth)acrylate)) were added to obtained dispersion liquid, and were further stirred. 1.5 g of a photopolymerization initiator (IRGACURE (Registered Trademark) 819 manufactured by BASF SE) and 0.5 g of a fluorine-based surfactant (FC4430 manufactured by 3M Company) were further added, and thus, a coating liquid (a polymerizable composition for forming a light scattering layer) was prepared.

—Coating and Curing of Polymerizable Composition for Forming Light Scattering Layer—

Feeding was set such that the surface of the PET film of the barrier film 11 described above became a coating surface, handling was performed until the film reached the die coater, and coating was performed. A wet coating amount was adjusted by a feed pump, and coating was performed in a coating amount of 25 cm$^3$/m$^2$ (a thickness was adjusted to be approximately 12 µm in a dried film). After the film passed through a drying zone at 60° C. for 3 minutes, the film was wound around a backup roll of which the temperature was adjusted to 30° C., was cured with an ultraviolet ray of 600 mJ/cm², and then, was wound. Thus, a laminated film 13 of the barrier film 11 and the light scattering layer was obtained.

As a result of measuring the haze of the obtained laminated film 13 on the basis of JIS K 7136 by using a hazemeter NDH2000 manufactured by Nippon Denshoku Industries Co., Ltd., the haze of the obtained laminated film 13 was 90%.

Preparation of Wavelength Conversion Member of Example 1

A quantum dot-containing polymerizable composition A described below was prepared, was filtered through a polypropylene filter having a pore diameter of 0.2 µm, and then, was dried for 30 minutes under reduced pressure, and thus, was used as a coating liquid. A quantum dot concentration in a toluene dispersion liquid described below was 1 mass %.

Quantum Dot-Containing Polymerizable Composition A
Toluene Dispersion Liquid of Quantum Dot 1 (Maximum Light Emission: 535 nm) 10.0 parts by mass
Toluene Dispersion Liquid of Quantum Dot 2 (Maximum Light Emission: 620 nm) 1.0 part by mass
Lauryl Methacrylate 80.8 parts by mass
Trimethylol Propane Triacrylate 18.2 parts by mass
Photopolymerization initiator 1.0 part by mass
(IRGACURE 819 (manufactured by BASF SE))

A dispersion liquid (CZ520-100 manufactured by NN-LABS, LLC.) of a quantum dot having a maximum light emission wavelength of 535 nm was used as the toluene dispersion liquid of the quantum dot 1 used in Example 1. In addition, a dispersion liquid (CZ620-100 manufactured by NN-LABS, LLC.) of the quantum dot having a maximum light emission wavelength of 630 nm was used as the toluene dispersion liquid of the quantum dot 2. All of the quantum dots contained in the dispersion liquid were quantum dots containing CdSe as a core, ZnS as a shell, and octadecyl amine as a ligand, and were dispersed in toluene at a concentration of 3 mass %.

The laminated film 13 prepared in the sequence described above was used as a first film, the barrier film 11 was used as a second film, and a wavelength conversion member was obtained according to the manufacturing step described with reference to FIG. 3 and FIG. 4. Specifically, the laminated film 13 was prepared as the first film, the quantum dot-containing polymerizable composition A prepared as described above was applied onto the surface of the inorganic layer by a die coater while continuously handling the laminated film 13 at a speed of 1 m/minute and a tensile force of 60 N/m, and thus, a coated film having a thickness of 50 µm was formed. Subsequently, the first film (the laminated film 13) on which the coated film was formed was wound around a backup roller, the second film (the barrier film 11) was laminated on the coated film in a direction where the surface of the inorganic layer was in contact with the coated film, and the coated film passed through a heating zone at 100° C. for 3 minutes while continuously handle the coated film in a state of being sandwiched between the first film and the second film. After that, the quantum dot-containing polymerizable composition A was cured by being irradiated with an ultraviolet ray by using an air-cooled metal halide lamp (manufactured by EYE GRAPHICS CO., LTD.) of 160 W/cm, and thus, a wavelength conversion layer containing a quantum dot was formed. Irradiation dose of the ultraviolet ray was 2,000 mJ/cm². In addition, L1 was 50 mm, L2 was 1 mm, and L3 was 50 mm.

The coated film is cured by being irradiated with the ultraviolet ray described above, and a cured layer (the wavelength conversion layer) was formed, and thus, a wavelength conversion member was manufactured. The thickness of the cured layer of the wavelength conversion member was approximately 50 µm. Thus, the wavelength conversion member of Example 1 was obtained in which the laminated film 13 and the barrier film 11 were respectively provided on both surfaces of the wavelength conversion layer, both main surfaces of the wavelength conversion layer were directly in contact with the inorganic layers of both of the films, and the light scattering layer was formed on one surface.

Preparation of Wavelength Conversion Member of Example 2

A wavelength conversion member was prepared by the same method as that in Example 1 except that 50 g of a zirconia dispersion liquid (AX-ZP manufactured by NIPPON SHOKUBAI CO., LTD.) was added as the dispersion liquid containing refractive index adjustment particles to the polymerizable composition for forming a light scattering layer, and the polymerizable composition for forming a light scattering layer was applied by adjusting the thickness in the dried film to be approximately 6 µm.

As a result of measuring the haze of the laminated film (a laminated film of the barrier film 11 and the light scattering layer) included in the wavelength conversion member of Example 2 by the same method as that in Example 1, the haze of the laminated film was 95%.

Preparation of Wavelength Conversion Member of Example 3

A wavelength conversion member was prepared by the same method as that in Example 1 except that 70 g of a fluorene skeleton-containing acrylate-based compound (OGSOL EA200 manufactured by OSAKA GAS CO., LTD.) was used as the polymerizable compound added to the polymerizable composition for forming a light scattering layer instead of 50 g of the acrylate-based compound (Viscoat 700HV manufactured by Osaka Organic Chemical Industry, Ltd.) and 40 g of the acrylate-based compound (8BR500 manufactured by TAISEI FINE CHEMICAL CO., LTD.), and the polymerizable composition for forming a light scattering layer was applied by adjusting the thickness in the dried film to be approximately 8 µm.

As a result of measuring the haze of the laminated film (a laminated film of the barrier film 11 and the light scattering layer) included in the wavelength conversion member of Example 3 by the same method as that in Example 1, the haze of the laminated film was 95%.

Preparation of Wavelength Conversion Member of Example 4

A wavelength conversion member was prepared by the same method as that in Example 1 except that 150 g of polytetrafluoroethylene (PTFE) particles (Microdispers-3000 manufactured by Polysciences, Inc., a particle size 3.0 µm) were used instead of 150 g of the silicone resin particles (TOSPEARL 120 manufactured by Momentive Performance Materials Inc., a particle size of 2.0 µm), and the polymerizable composition for forming a light scattering layer was applied by adjusting the thickness in the dried film to be approximately 8 µm.

As a result of measuring the haze of the laminated film (a laminated film of the barrier film 11 and the light scattering layer) included in the wavelength conversion member of Example 4 by the same method as that in Example 1, the haze of the laminated film was 95%.

Preparation of Wavelength Conversion Member of Comparative Example 1

A wavelength conversion member was prepared by the same method as that in Example 1 except that 20 g of $TiO_2$ (HTD760 manufactured by TAYCA CORPORATION) was added as the refractive index adjustment particles to the polymerizable composition for forming a light scattering layer, and the polymerizable composition for forming a light scattering layer was applied by adjusting the thickness in the dried film to be approximately 6 µm.

As a result of measuring the haze of the laminated film (a laminated film of the barrier film 11 and the light scattering layer) included in the wavelength conversion member of Comparative Example 1 by the same method as that in Example 1, the haze of the laminated film was 98%.

Preparation of Wavelength Conversion Member of Comparative Example 2

A wavelength conversion member was prepared by the same method as that in Example 1 except that 150 g of styrene resin particles (SX-130 manufactured by Soken Chemical & Engineering Co., Ltd., a particle size of 1.3 µm) was used instead of 150 g of the silicone resin particles (TOSPEARL 120 manufactured by Momentive Performance Materials Inc., a particle size of 2.0 µm), 90 g of dipentaerythritol hexaacrylate (DPHA) (A-DPH manufactured by Shin Nakamura Chemical Co., Ltd.) was used as the polymerizable compound added to the polymerizable composition for forming a light scattering layer instead of the 50 g of the acrylate-based compound (Viscoat 700HV manufactured by Osaka Organic Chemical Industry, Ltd.) and 40 g of the acrylate-based compound (8BR500 manufactured by TAISEI FINE CHEMICAL CO., LTD.), and the polymerizable composition for forming a light scattering layer was applied by adjusting the thickness in the dried film to be approximately 8 µm.

As a result of measuring the haze of the laminated film (a laminated film of the barrier film 11 and the light scattering layer) included in the wavelength conversion member of Comparative Example 2 by the same method as that in Example 1, the haze of the laminated film was 95%.

<Evaluation Method>

(Measurement of Average Refractive Indices n1 and n2)

A sample for measuring a refractive index of the wavelength conversion layer was prepared by the following method.

A wavelength conversion member was prepared by the same method as described above except that the first film and the second film were changed to PET films (A4300: manufactured by TOYOBO CO., LTD). The thickness of the cured layer of the obtained wavelength conversion member was 150 µm. The PET films on both surfaces were peeled off from the obtained wavelength conversion member, and thus, a single film of the wavelength conversion layer was obtained, and the average refractive index n1 was measured by using the single film of the wavelength conversion layer as a wavelength conversion layer for measuring a refractive index.

A sample for measuring a refractive index of a matrix of a light scattering layer was prepared by the following method.

A polymerizable composition was prepared by the same method as described above except that the light scattering particles were not added. The prepared polymerizable composition was applied onto a surface of a PET film (A4100: manufactured by TOYOBO CO., LTD.) and was cured by the same method as that in the formation of the light scattering layer of each of the examples and the comparative examples, and then, the PET film was peeled off, and thus, a single film of a cured layer having a thickness of 12 µm was obtained, and the average refractive index n2 was measured by using the single film of the cured layer as a matrix of a light scattering layer for measuring a refractive index.

In the prepared wavelength conversion layer for measuring a refractive index and the prepared matrix of the light scattering layer for measuring a refractive index, the refractive indices nx and ny in the in-plane slow axis direction and in the fast axis direction were obtained by using a multi-wavelength ABBE'S REFRACTOMETER DR-M2 manufactured by ATAGO CO., LTD. Further, the refractive index nz was calculated from the values and the retardation Re and the layer thickness in the in-plane direction measured by the method described above, as described above, and thus, the average refractive indices n1 and n2 were obtained as the average value of nx, ny, and nz.

Furthermore, a film cross-sectional surface of the layer thickness described above was cut, and was measured by using a scanning electron microscope (SEM) (S-3400N manufactured by Hitachi High-Technologies Corporation).

(Measurement of Blue Light Absorptivity of Light Scattering Layer)

The laminated film (the barrier film with a light scattering, layer) 13 prepared in each of the examples and the comparative examples was cut into a size of 2 cm square, and then, was disposed in an integrating sphere of an absolute PL quantum yield measurement device (C9920-02) manufactured by Hamamatsu Photonics K.K., blue light having a light emission center wavelength at a wavelength of 450 nm which is a light emission center wavelength of a blue light source provided in a commercially available tablet terminal (Kindle Fire HDX 7" manufactured by Amazon.com, Inc.) used in brightness measurement described below was incident on the laminated film 13, and thus, detection light intensity I at a wavelength of 450 nm was measured. Similarly, in a blank in which the film was not disposed in the integrating sphere, transmission light intensity $I_0$ at a wavelength of 450 nm was measured, and thus, a blue light absorptivity A1 of the laminated film 13 was calculated by the following expression.

$$A1=(I_0-I)/I_0 \quad \text{(Expression)}$$

Similarly, a blue light absorptivity A2 of the barrier film 11 in which the light scattering layer was not formed was measured, and a difference with respect to the blue light absorptivity A1 of the laminated film 13 was obtained by the following expression, and thus, a blue light absorptivity A of a single layer of the light scattering layer was calculated.

$$A=A2-A1 \quad \text{(Expression)}$$

(Measurement of Brightness)

A commercially available tablet terminal (Kindle Fire HDX 7" manufactured by Amazon.com, Inc.) including a blue light source in a backlight unit was disassembled, and the backlight unit was taken out, the wavelength conversion member of each of the examples and the comparative examples which was cut into the shape of a rectangle was placed on a light guide plate, and two prism sheets taken out from Kindle Fire HDX 7" were superimposed thereon such that directions of surface irregular patterns were orthogonal to each other. The backlight unit was turned on, and a brightness was measured by a brightness meter (SR3 manufactured by TOPCON CORPORATION) disposed at a distance of 740 mm in a vertical direction from the surface of the backlight unit. In a case where the brightness to be measured is greater than or equal to 15,300 $cd/m^2$, it is possible to determine that a liquid crystal display device in which the backlight unit is incorporated can display an image having a high brightness.

The results described above are shown in Table 1.

TABLE 1

| | Average Refractive Index n1 of Wavelength Conversion Layer | Average Refractive Index n2 of Matrix of Light Scattering Lay | Blue Light Absorptivity [%] | Brightness [$cd/m^2$] |
|---|---|---|---|---|
| Example 1 | 1.45 | 1..52 | 1.5 | 16000 |
| Example 2 | 1.45 | 1.70 | 3.0 | 15800 |
| Example 3 | 1.45 | 1.60 | 1.0 | 15500 |
| Example 4 | 1.45 | 1.52 | 1.5 | 16500 |
| Comparative Example 1 | 1.45 | 1.70 | 10.0 | 13000 |
| Comparative Example 2 | 1.45 | 1.45 | 3.0 | 15000 |

From the results shown in Table 1, in Examples 1 to 4, it is possible to confirm that improvement in the brightness is attained.

Preparation of Wavelength Conversion Member of Example 5

A wavelength conversion member was prepared by the same method as that in Example 1 except that 0.45 g of 3,9-bis[1,1-dimethyl-2-{(3-tertiary butyl-4-hydroxy-5-methyl phenyl) propionyloxy} ethyl]-2,4,8,10-tetraoxaspiro [5.5]undecane (SUMILIZER GA-80 manufactured by Sumitomo Chemical Company, Limited) was added to the polymerizable composition for forming a light scattering layer.

As a result of measuring the haze of the laminated film (a laminated film of the barrier film 11 and the light scattering layer) included in the wavelength conversion member of Example 5 by the same method as that in Example 1, the haze of the laminated film was 91%.

Preparation of Wavelength Conversion Member of Example 6

A wavelength conversion member was prepared by the same method as that in Example 1 except that 0.45 g of tetrakis(3-(3,5-di-tertiary butyl-4-hydroxy phenyl) propionate) methane (IRGANOX 1010 manufactured by BASF SE) was added to the polymerizable composition for forming a light scattering layer.

As a result of measuring the haze of the laminated film (a laminated film of the barrier film 11 and the light scattering layer) included in the wavelength conversion member of Example 6 by the same method as that in Example 1, the haze of the laminated film was 86%.

Preparation of Wavelength Conversion Member of Example 7

A wavelength conversion member was prepared by the same method as that in Example 1 except that 50 g of trimethylol propane tri(meth)acrylate (LIGHTACRYLATE TMP-A manufactured by KYOEISHA CHEMICAL Co., LTD), 30 g of ethoxylated pentaerythritol tetra(meth)acrylate (ATM-35E manufactured by Shin Nakamura Chemical Co., Ltd.), and 10 g of 1,9-nonane diol di(meth)acrylate (LIGHTACRYLATE 1,9ND-A manufactured by KYOEISHA CHEMICAL Co., LTD) were used as the polymerizable compound added to the polymerizable composition for forming a light scattering layer instead of 50 g of the acrylate-based compound (Viscoat 700HV manufactured by Osaka Organic Chemical Industry, Ltd.) and 40 g of the acrylate-based compound (8BR500 manufactured by TALSEIFINE CHEMICAL CO., LTD.).

As a result of measuring the haze of the laminated film (a laminated film of the barrier film 11 and the light scattering layer) included in the wavelength conversion member of Example 7 by the same method as that in Example 1, the haze of the laminated film was 84%.

In the wavelength conversion members of Examples 5 to 7, various evaluations were performed as with Example 1. In the blue light absorptivity and the brightness, measurement using the same method as that in Example 1 (hereinafter, referred to as "measurement before a durability test") and measurement after the durability test described below were performed. In the wavelength conversion member of Example 1, the measurement after the durability test was performed.

(Measurement After Durability Test)

The wavelength conversion member was left to stand in an environment of 85° C. for 150 hours, and then, the blue light absorptivity and the brightness were measured by the same method as that of the measurement before the durability test.

The results described above are shown in Table 2.

TABLE 2

| | Average Refractive Index n1 of Wavelength Conversion Layer | Average Refractive Index n2 of Matrix of Light Scattering Layer | Before Durability Test | | After Durability Test | |
|---|---|---|---|---|---|---|
| | | | Blue Light Absorptivity [%] | Brightness [$cd/m^2$] | Blue Light Absorptivity [%] | Brightness [$cd/m^2$] |
| Example 1 | 1.45 | 1.52 | 1.5 | 16000 | 4.3 | 15390 |
| Example 5 | 1.45 | 1.52 | 1.5 | 16100 | 2.6 | 15750 |

TABLE 2-continued

|  | Average Refractive Index n1 of Wavelength Conversion Layer | Average Refractive Index n2 of Matrix of Light Scattering Layer | Before Durability Test | | After Durability Test | |
| --- | --- | --- | --- | --- | --- | --- |
|  |  |  | Blue Light Absorptivity [%] | Brightness [cd/m$^2$] | Blue Light Absorptivity [%] | Brightness [cd/m$^2$] |
| Example 6 | 1.45 | 1.52 | 1.6 | 15900 | 2.6 | 15560 |
| Example 7 | 1.45 | 1.51 | 1.4 | 16100 | 2.7 | 15720 |

From the results shown in Table 2, in Examples 5 to 7, it was confirmed that improvement in the brightness identical to that of Example 1 was attained, and improvement in durability was realized, compared to Example 1.

INDUSTRIAL APPLICABILITY

The present invention is useful in the manufacturing field of a liquid crystal display device.

What is claimed is:

1. A backlight unit, comprising:
a light source allowing light having a light emission center wavelength of λ nm to exit; and
a wavelength conversion member positioned on an optical path of the light exiting from the light source,
wherein the wavelength conversion member includes a wavelength conversion layer containing a fluorescent material which is excited by exciting light and emits fluorescent light, and a light scattering layer containing particles having a particle size of greater than or equal to 0.1 µm in a matrix,
wherein an average refractive index n1 of the wavelength conversion layer satisfies a relationship of n1<n2 with respect to an average refractive index n2 of the matrix of the light scattering layer, and
wherein a light absorptivity of the light scattering layer at the wavelength of λ nm is less than or equal to 8.0%,
wherein the light scattering layer is a cured layer of a polymerizable composition and the polymerizable composition comprises the particles having the particle size of greater than or equal to 0.1 µm; and
wherein the light scattering layer comprises at least one type of (meth)acrylate selected from the group consisting of difunctional (meth)acrylate in which an alkyl group having 5 to 9 carbon atoms is linked between (meth)acrylates and difunctional or trifunctional or higher (meth)acrylate in which alkylene oxide is linked between (meth)acrylates, and at least one type of trifunctional or higher (meth)acrylate which does not contain alkylene oxide.

2. The backlight unit according to claim 1,
wherein the light scattering layer is disposed on an exiting side from the wavelength conversion layer.

3. The backlight unit according to claim 1,
wherein the fluorescent material is a quantum dot.

4. The backlight unit according to claim 1,
wherein the average refractive index n2 of the matrix of the light scattering layer is in a range of 1.45 to 2.00, and satisfies the relationship of n1<n2.

5. The backlight unit according to claim 1,
wherein the average refractive index n1 of the wavelength conversion layer is in a range of 1.43 to 1.60, and satisfies the relationship of n1<n2.

6. The backlight unit according to claim 1,
wherein the wavelength conversion layer and the light scattering layer are laminated through a barrier film.

7. The backlight unit according to claim 6,
wherein the barrier film includes at least an inorganic layer.

8. The backlight unit according to claim 7,
wherein the inorganic layer is an inorganic layer containing at least one type selected from the group consisting of a silicon oxide, a silicon nitride, a silicon carbide, and an aluminum oxide.

9. The backlight unit according to claim 7,
wherein the inorganic layer, an organic layer, and a base material film are adjacently arranged in the barrier film in this order from a wavelength conversion layer side towards a light scattering layer side.

10. The backlight unit according to claim 1,
wherein the wavelength of λ nm is in a wavelength range of blue light.

11. A liquid crystal display device, comprising:
the backlight unit according to claim 1; and
a liquid crystal cell.

12. A wavelength conversion member, comprising:
a wavelength conversion layer containing a fluorescent material which is excited by exciting light and emits fluorescent light; and
a light scattering layer containing particles having a particle size of greater than or equal to 0.1 µm in a matrix,
wherein an average refractive index n1 of the wavelength conversion layer satisfies a relationship of n1<n2 with respect to an average refractive index n2 of the matrix of the light scattering layer, and
wherein a light absorptivity of the light scattering layer at a wavelength of 450 nm is less than or equal to 8.0%,
wherein the light scattering layer is a cured layer of a polymerizable composition and the polymerizable composition comprises the particles having the particle size of greater than or equal to 0.1 µm; and
wherein the light scattering layer comprises at least one type of (meth)acrylate selected from the group consisting of difunctional (meth)acrylate in which an alkyl group having 5 to 9 carbon atoms is linked between (meth)acrylates and difunctional or trifunctional or higher (meth)acrylate in which alkylene oxide is linked between (meth)acrylates, and at least one type of trifunctional or higher (meth)acrylate which does not contain alkylene oxide.

13. The wavelength conversion member according to claim 12,
wherein the fluorescent material is a quantum dot.

14. The wavelength conversion member according to claim 12,
wherein the average refractive index n2 of the matrix of the light scattering layer is in a range of 1.45 to 2.00, and satisfies the relationship of n1<n2.

15. The wavelength conversion member according to claim 12,
wherein the average refractive index n1 of the wavelength conversion layer is in a range of 1.43 to 1.60, and satisfies the relationship of n1<n2.

16. The wavelength conversion member according to claim 12,
wherein the wavelength conversion layer and the light scattering layer are laminated through a barrier film.

17. The wavelength conversion member according to claim 16,
wherein the barrier film includes at least an inorganic layer.

18. The wavelength conversion member according to claim 17,
wherein the inorganic layer is an inorganic layer containing at least one type selected from the group consisting of a silicon oxide, a silicon nitride, a silicon carbide, and an aluminum oxide.

19. The wavelength conversion member according to claim 17,
wherein the inorganic layer, an organic layer, and a base material film are adjacently arranged in the barrier film in this order from a wavelength conversion layer side towards a light scattering layer side.

* * * * *